United States Patent
Calmon et al.

(10) Patent No.: US 11,113,171 B2
(45) Date of Patent: Sep. 7, 2021

(54) EARLY-CONVERGENCE DETECTION FOR ONLINE RESOURCE ALLOCATION POLICIES FOR ITERATIVE WORKLOADS

(71) Applicant: EMC IP Holding Company LLC, Hopkinton, MA (US)

(72) Inventors: Tiago Salviano Calmon, Rio de Janeiro (BR); Eduardo Vera Sousa, Niterói (BR); Vinícius Michel Gottin, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 16/554,910

(22) Filed: Aug. 29, 2019

(65) Prior Publication Data
US 2021/0064506 A1    Mar. 4, 2021

(51) Int. Cl.
*G06F 11/34* (2006.01)
*G06F 9/50* (2006.01)
*G06F 9/48* (2006.01)

(52) U.S. Cl.
CPC ........ *G06F 11/3433* (2013.01); *G06F 9/4843* (2013.01); *G06F 9/5011* (2013.01); *G06F 11/3452* (2013.01); *G06F 2209/5022* (2013.01)

(58) Field of Classification Search
CPC .. G06F 11/3433; G06F 9/4843; G06F 9/5011; G06F 11/3452
See application file for complete search history.

(56) References Cited

U.S. PATENT DOCUMENTS

| | | |
|---|---|---|
| 8,250,581 B1 * | 8/2012 | Blanding .............. G06F 9/5011 718/104 |
| 10,412,118 B1 | 9/2019 | Davis et al. |
| 2002/0055989 A1 | 5/2002 | Stringer-Calvert et al. |
| 2005/0188088 A1 * | 8/2005 | Fellenstein ........... G06F 9/5072 709/226 |

(Continued)

OTHER PUBLICATIONS

Atzori et al., "The Internet of Things: A survey," Computer Networks, 54 (2010) 2787-2805.

(Continued)

*Primary Examiner* — Benjamin C Wu
(74) *Attorney, Agent, or Firm* — Ryan, Mason & Lewis, LLP

(57) ABSTRACT

Techniques are provided for adaptive resource allocation for workloads with early-convergence detection. One method comprises obtaining a dynamic system model based on a relation between an amount of a resource for multiple workloads and a predefined service metric; obtaining an instantaneous value of the predefined service metric; obtaining an adjustment to the amount of the resource for a given workload based on a difference between the instantaneous value and a target value of the predefined service metric; determining whether the given workload has converged based on an evaluation of one or more predefined convergence criteria; and removing the given workload from a controlled workload list when the given workload has converged. The given workload can be reinserted in the controlled workload list when the given one of the plurality of workloads fails to satisfy a predefined divergence threshold.

20 Claims, 14 Drawing Sheets

(56) References Cited

U.S. PATENT DOCUMENTS

| | | | |
|---|---|---|---|
| 2007/0234365 A1* | 10/2007 | Savit | G06F 9/505 |
| | | | 718/104 |
| 2007/0283016 A1 | 12/2007 | Pendarakis et al. | |
| 2008/0022285 A1* | 1/2008 | Cherkasova | G06F 9/505 |
| | | | 718/104 |
| 2008/0180247 A1 | 7/2008 | Deoalikar et al. | |
| 2010/0201573 A1 | 12/2010 | Lamming | |
| 2012/0110582 A1* | 5/2012 | Ferdous | G06F 9/5044 |
| | | | 718/101 |
| 2013/0185433 A1* | 7/2013 | Zhu | H04L 43/0882 |
| | | | 709/226 |
| 2015/0040133 A1* | 2/2015 | Caufield | G06F 9/5038 |
| | | | 718/103 |
| 2017/0048308 A1 | 2/2017 | Qaisar | |
| 2017/0161199 A1* | 6/2017 | Shah | G06F 12/0895 |
| 2017/0255491 A1 | 9/2017 | Bradshaw et al. | |
| 2018/0101214 A1* | 4/2018 | Mahindru | G06F 9/5077 |
| 2018/0246558 A1 | 8/2018 | Morad | |
| 2019/0075184 A1 | 3/2019 | Seed, IV et al. | |
| 2019/0101903 A1 | 4/2019 | Katti et al. | |
| 2019/0319861 A1 | 10/2019 | Pan et al. | |
| 2020/0167145 A1 | 5/2020 | Franchitti et al. | |
| 2020/0177671 A1 | 6/2020 | Tofighbakhsh et al. | |
| 2020/0301741 A1 | 9/2020 | Gabrielson et al. | |

OTHER PUBLICATIONS

Schooler et al., "Architectural Vision for a Data-Centric IoT: Rethinking Things, Trust and Clouds," in Distributed Computing Systems (ICDCS), 2017 IEEE 37th International Conference on (pp. 1717-1728). IEEE.

Bonomi et al., "Fog computing and its role in the internet of things," In Proceedings of the first edition of the MCC workshop on Mobile cloud computing (pp. 13-16). ACM, 2012.

Shi et al., "Edge computing: Vision and challenges," IEEE Internet of Things Journal, 3(5), 637-646.

Mahadev et al., "The Case for VM-Based Cloudlets in Mobile Computing, Pervasive Computing," IEEE, 8 (2009) 14-23.

Morabito et al., "Consolidate IoT edge computing with lightweight virtualization," IEEE Network, 32(1), 102-111.

Ismail et al., "Evaluation of docker as edge computing platform," In Open Systems (ICOS), 2015 IEEE Confernece on (pp. 130-135). IEEE.

Mahmud et al., "Fog computing: A taxonomy, survey and future directions," In Internet of Everything (pp. 103-130). Springer, Singapore.

Inaba et al., "Applications of weighted Voronoi diagrams and randomization to variance-based k-clustering," In Proceedings of the tenth annual symposium on Computational geometry (pp. 332-339). ACM.

Thönes, J. "Microservices." IEEE Software 32.1 (2015): 116-116.

Lewis et al., "Microservices," Available in: http://martinfowler.com/articles/microservices.html. Access in: Sep. 27, 2017.

Pahl et al., "Containers and clusters for edge cloud architectures—a technology review," In Future Internet of Things and Cloud (FiCloud), 2015 3rd International Conference on (pp. 379-386). IEEE.

Misra et al., "On Theoretical Modeling of Sensor Cloud: A Paradigm Shift From Wireless Sensor Network," IEEE Systems Journal, vol. 11, No. 2, pp. 1084-1093, Jun. 2017.

Taleb et al., "Mobile edge computing potential in making cities smarter," IEEE Communications Magazine, 55(3), 38-43.

Bouzeghoub, M., "A framework for analysis of data freshness," In Proceedings of the 2004 international workshop on Information quality in information systems (pp. 59-67). ACM.

"CEP," Available in: https://en.wikipedia.org/wiki/Complex_event_processing.

"Publish—subscribe pattern," Available in: https://en.wikipedia.org/wiki/Publish%E2%80%93subscribe_pattern.

Chatterjee et al., "Optimal Composition of a Virtual Sensor for Efficient Virtualization within Sensor-Cloud," in Proceedings of IEEE International Conferencce on Communications, Jun. 2015, pp. 448-453.

Yi et al., "A survey of fog computing: concepts, applications and issues." Proceedings of the 2015 Workshop on Mobile Sig Data. ACM, 2015.

Santos et al., "Olympus: The cloud of sensors," IEEE Cloud Computing, 2(2), 48-56.

Delicato et al.,. "The Resource Management Challenge in IoT," In Resource Management for Internet of Things (pp. 7-18). Springer International Publishing (2017).

Wang et al., "ENORM: A framework for edge node resource management," IEEE Transactions on Services computing (2017).

Skarlat et al., "Resource Provisioning for IoT Services in the Fog," 2016 IEEE 9th International Conference on Service-Oriented Computing and Applications (SOCA), Macau, 2016, pp. 32-39.

Roy et al., "DIVISOR: Dynamic Virtual Sensor Formation for Overlapping Region in IoT-based Sensor-Cloud," Proceedings of the IEEE Wireless Communications and Networking Conference, 2018.

Skarlat et al., "Optimized IoT service placement in the fog," Serv. Oriented Comput. Appl. 11, 4 (Dec. 2017), 427-443. DOI: https://doi.org/10.1007/s11761-017-0219-8 (2017).

Dautov et al., "Pushing Intelligence to the Edge with a Stream Processing Architecture," 2017 IEEE International Conference on Internet of Things (iThings) and IEEE Green Computing and Methods and Apparatus for Real-Time Anomaly Detection over Sets of Time Series—Nov. 2017 Dell EMC Confidential pp. 24 of 24 Communications (GreenCom) and IEEE Cyber, Physical and Social Computing (CPSCom) and IEEE Smart Data (SmartData), Exeter, 2017, pp. 792-799.

"Hypervisor," Available in: https://en.wikipedia.org/wiki/Hypervisor.

"EdgeX Foundry," Available in: https://www.edgexfoundry.org.

"Orion Context Broker," Available in: https://catalogue.fiware.org/enablers/publishsubscribe-context-broker-orion-context-broker.

"FIWARE NGSI Open RESTful API Specification," Available in: http://forge.fiware.org/plugins/mediawiki/wiki/fiware/index.php/FIWARE_NGSI_Open_RESTful_API_Specification. Last accessed: Jun. 28, 2018.

"ZeroMQ," Available in: https://en.wikipedia.org/wiki/ZeroMQ.

U.S. Appl. No. 15/941,434, entitled, "Allocation of Shared Computing Resources Using Source Code Feature Extraction and Machine Learning", filed Mar. 30, 2018.

U.S. Appl. No. 16/554,897, entitled, "Model-Based Initialization of Workloads for Resource Allocation Adaptation", filed Aug. 29, 2019.

U.S. Appl. No. 16/034,432, entitled, "Resource Allocation and Provisioning in a Multi-Tier Edge-Cloud Virtualization Environment", filed Jul. 13, 2018.

U.S. Appl. No. 16/039,743, entitled, "Allocation of Shared Computing Resources Using Source Code Feature Extraction and Clustering-Based Training of Machine Learning Models", filed Jul. 19, 2018.

U.S. Appl. No. 16/259,244, entitled, Building Neural Networks for Resource Allocation for Iterative Workloads Using Reinforcement Learning, filed Jan. 28, 2019.

U.S. Appl. No. 16/401,604, entitled, "Resource Allocation and Provisioning in a Multi-Tier Edge-Cloud Virtualization Environment", filed May 2, 2019.

U.S. Appl. No. 16/263,135 entitled, "Adaptive Look-Ahead Configuration for Prefetching Data in Input/Output Operations," filed Jan. 31, 2019.

U.S. Appl. No. 16/397,596, entitled, "Adaptive Look-Ahead Configuration for Pre-Fetching Data in Input/Output Operations Based on Request Size and Frequency", filed Apr. 29, 2019.

U.S. Appl. No. 16/456,551, entitled "Adaptive Controller for Online Resource Allocation for Multiple Workloads," filed Jun. 28, 2019.

U.S. Appl. No. 16/554,897, entitled, "Model-Based Initialization of Workloads for Resource Adaptation" filed Aug. 29, 2019.

U.S. Appl. No. 16/400,289, entitled "Adaptive Controller for Online Adaptation of Resource Allocation Policies for Iterative Workloads Using Reinforcement Learning," filed May 1, 2019.

U.S. Appl. No. 15/497,803, entitled "Network-Based Combination of Heterogeneous Machine Learning Models," filed Apr. 26, 2017.

(56) References Cited

OTHER PUBLICATIONS

Liu et al., "Adaptive Entitlement Control of Resource Containers on Shared Servers,"IFIP/IEEE International Symposium on Integrated Network Management, pp. 163-176, May 2005.
D. Merkel, "Docker: Ligtweight Linux Containers for Consistent Development and Deployment," Linux Journal, vol. 2, p. 239, (2014).
Betts et al., "Estimating the WCET of GPU-accelerated applications using hybrid analysis," Real-Time Systems (ECRTS), 2013.
K. Hornik, "Approximation capabilities of multilayer feedforward networks," Neural networks, vol. 2, No. 4, pp. 251-257, 1991.

* cited by examiner

FIG. 6

```
function check_convergence (all_workloads, threshold):

for controlled_workload in controlled_workloads:
        error <- check error(controlled_workload)
        if error < threshold:
            move controlled_workload to end of converged_workloads
    for monitored_workload in monitored_workloads:
        error <- check_error(monitored_workload)
        if error> threshold:
            move monitored_workload to end of controlled_workloads
```

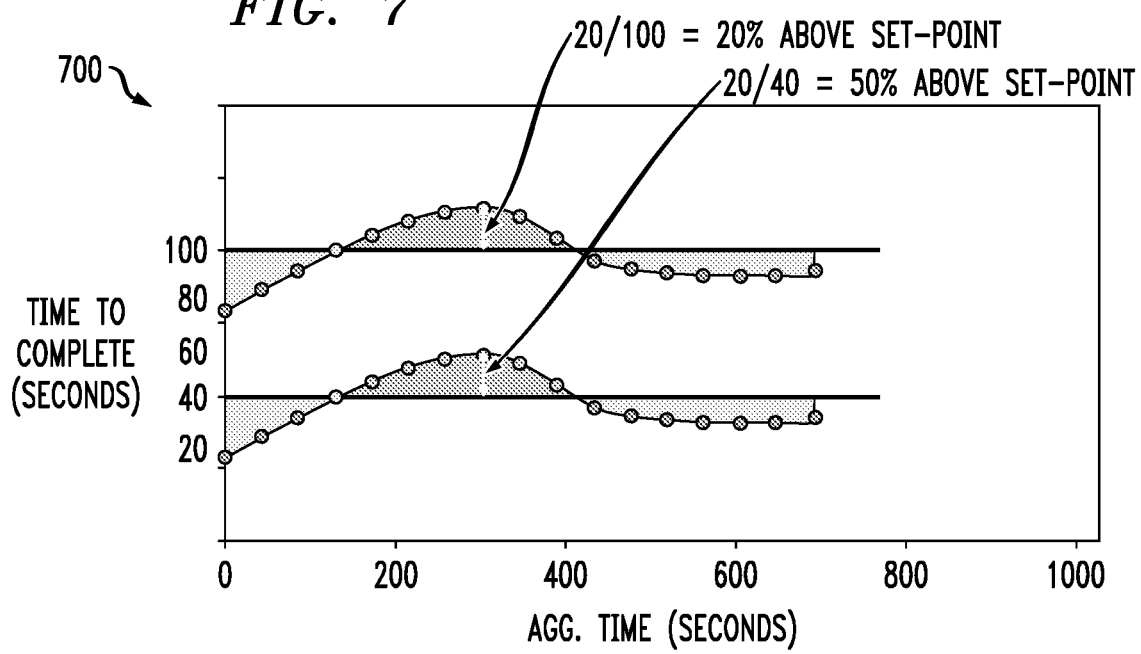

FIG. 7

EARLY-CONVERGENCE DETECTION FOR ONLINE RESOURCE ALLOCATION POLICIES FOR ITERATIVE WORKLOADS

CROSS-REFERENCE TO RELATED APPLICATION(S)

The present application is related to U.S. patent application Ser. No. 16/554,897, filed Aug. 29, 2019, entitled "Model-Based Initialization of Workloads for Resource Allocation Adaptation," incorporated by reference herein in its entirety.

FIELD

The field relates generally to resource allocation techniques.

BACKGROUND

Cloud computing has become increasingly popular due to a number of benefits. For example, cloud computing offers pay-per-use computation for customers and resource sharing for service providers. Through virtualization, a pool of computation devices can be abstracted and computational resources can be offered that are tailored to the needs of customers, who may contract for more computation as their needs grow.

Using an infrastructure efficiently to execute workloads while respecting Service Level Agreements (SLAs) and, thus, guaranteeing a specified Quality of Service (QoS), poses a number of challenges. Service providers aim to provide services to their customers while respecting SLAs and minimizing resource usage. One challenge is that SLAs are typically set prior to execution of a job, but the execution environment is subject to a number of possible disturbances (e.g., poor knowledge about actual resource needs, demand peaks and/or hardware malfunctions). Thus, employing a fixed amount of allocated resources may not be a good solution.

A need therefore exists for improved techniques for resource allocation for execution of multiple workloads.

SUMMARY

In one embodiment, a method comprises obtaining a dynamic system model based on a relation between an amount of at least one resource for a plurality of workloads in a controlled workload list and at least one predefined service metric, wherein the plurality of workloads in the controlled workload list participate in an adaptation cycle; obtaining an instantaneous value of the at least one predefined service metric; obtaining an adjustment to the amount of the at least one resource for a given one of the plurality of workloads in the controlled workload list based at least in part on a difference between the instantaneous value of the at least one predefined service metric and a target value for the at least one predefined service metric; determining whether the given one of the plurality of workloads has converged based on an evaluation of one or more predefined convergence criteria; and removing the given one of the plurality of workloads from the controlled workload list when the given one of the plurality of workloads has converged.

In some embodiments, the given one of the plurality of workloads is reinserted in the controlled workload list when the given one of the plurality of workloads fails to satisfy a predefined divergence threshold. A workload that finishes processing is optionally removed from the controlled workload list and/or a monitored workload list.

Other illustrative embodiments include, without limitation, apparatus, systems, methods and computer program products comprising processor-readable storage media.

BRIEF DESCRIPTION OF THE DRAWINGS

FIG. 6 illustrates exemplary pseudo code for a convergence detection process, according to one embodiment of the disclosure;

FIG. 7 illustrates two workloads being executed concurrently and their respective error metrics using relative error, according to at least one embodiment;

DETAILED DESCRIPTION

Figure 1:
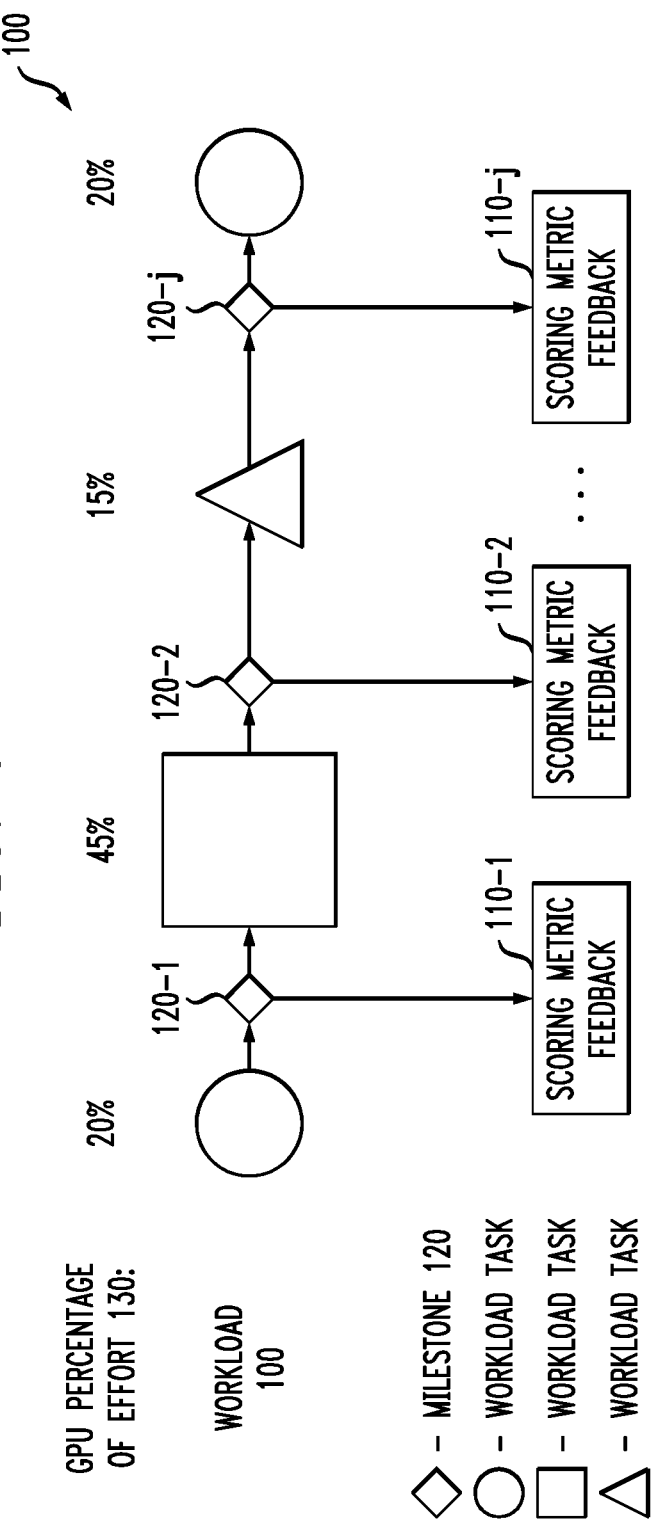
FIG. 1 illustrates a given workload with milestones and associated effort for a given infrastructure, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for adapting a resource allocation for multiple workloads.

In one or more embodiments, online resource allocation techniques are provided for multiple concurrent workloads based on a cyclic adaptive controller (e.g., learning how the interference affects each monitored workload, while also providing stability, resilience to disturbances and robustness). See, for example, U.S. patent application Ser. No. 16/456,551, filed Jun. 28, 2019, entitled "Adaptive Controller for Online Resource Allocation for Multiple Workloads," incorporated by reference herein in its entirety.

One or more embodiments of the resource allocation techniques described in U.S. patent application Ser. No. 16/456,551 may limit the number of controlled workloads and delay the convergence of each workload proportionally to the number of competing workloads. In at least one embodiment of the present disclosure, techniques are provided for the early detection and adaptation of the control loop of the cyclic adaptive controller to remove and re-insert converged and diverged workloads, as required. The disclosed approach enables more jobs to be controlled in parallel and allows faster convergence of workloads.

Cloud Computing has gained the attention of businesses because of its benefits, which include pay-per-use computation by customers and resource sharing for the service providers. Through virtualization, the main technology behind clouds, it is possible to abstract a pool of computation devices and offer computational resources better tailored to the needs of customers who may contract more computation as their necessities grow. In this environment, other resource abstractions emerged, the most prominent example being containers. It is also possible to offer computation without the explicit necessity of the customer to know which underlying infrastructure is running his or her code. This can be achieved in the Platform-as-a-Service (PaaS) paradigm and also the Function-as-a-Service (FaaS, serverless computing) paradigm.

In each of these paradigms, the usual agreements upon QoS expected by the customer are expressed through several Service Level Agreements (SLAs). These typically include response time, execution time, uptime percentage, among others metrics. The SLAs are usually agreed prior to the service through reference target metrics values. Providers aim at respecting these targets in order to avoid contractual fines. Furthermore, failing to meet the targets also diminishes the perceived trust of the provider by the customer.

One way to ensure SLAs is to dedicate a large, static amount of resources to each customer. There are problems with this approach. In general, an application cannot be assumed to be bounded by one particular resource. Some applications, for example, might have an input/output-intensive phase and, afterwards, a compute-intensive phase. Dedicating a large amount of resources to an application is often inefficient, resulting in spare resources at the different phases of the application. In addition, the initial guess on how many resources are needed to run an application might be over- or underestimated.

Another aspect of excessive resource allocation is that of the restrictions it applies to the service providers. Assuming a provider with a large pool of computational resources any particular application does not need to care about resource constraints (e.g., from the point of view of the application, more resources are always available within reasonable limits established by the SLA). However, from the point of view of the provider who deals with many customers concurrently, the volume of spare resources dictates how many jobs can be run in parallel while respecting SLAs. In this sense, optimizing the adaptation of resource allocation of a single job impacts the efficiency of the system as a whole.

In opposition to SLAs, which are set prior to the execution of a job, the execution environment is quite dynamic. New workloads might come and compete for resources and unplanned demand peaks might occur, which might disrupt the original workload planning due to tasks with higher priorities, a greater need to share the environment and overheads because of context switching. Service providers always aim to provide services to their customers respecting SLAs and minimizing resource usage. This is the scenario that provides the optimal profit for them. To do so, a static approach of allocation, which dedicates resources to a job from its start through its completion, is naturally inefficient, and, thus, sub-optimal.

A number of published techniques, however, use this static approach coupled with some probabilistic analysis to overprovision as little as possible. This avoids SLA infringements at the cost of having an inefficient allocation. Other works consider this problem as a queue theory problem. This is a special case and the representative power of queues is smaller than the one of a dynamic model. Furthermore, queueing models usually assume some knowledge a priori, such as the average processing rate of a request.

The resource allocation techniques described in U.S. patent application Ser. No. 16/456,551 are based on feedback of the job execution and prior knowledge of its stages. The disclosed resource allocation techniques solve a major problem of synchronous control in distinguishing between the impact of self-allocation of resources and the interference caused by the allocation of resources to concurrent workloads. While that approach allows for controlling multiple concurrent workloads, it imposes practical restrictions on both the number of workloads as well as the interval between each adaptation and control action.

One or more embodiments of the present disclosure provide for the early-detection and adaptation of the control loop for transparently handling converged workloads, speeding up the convergence of other workloads and easing limitations on the number of concurrently controlled workloads. Here, convergence is defined in some embodiments as being close enough to the set-point, e.g., step when iteration time reaches set-point within an acceptable percentage.

A characteristic of infrastructure provision is the variability in perceived demand. Service providers are willing to charge an amount per computation usage, and these providers can have a lot of customers. Thus, it is natural that the demand varies within different time frames, such as on a daily basis, a weekly basis or a monthly basis. This variation of demand itself imposes several challenges, since the intention of the provider is to serve each customer at the level of service defined in the contract. The aforementioned contracts, materialized in multiple SLAs, also impose a significant challenge: they are set prior to the service provisioning. This means that, no matter what happens in the time of execution, these SLAs must be respected. Examples of events that could disrupt providers include, but are not limited to, sharp demand peaks, malfunction of machines and unrealistic contracts. In some cases, it is not possible to reach every single SLA, and it is also an important decision to prioritize some of the workloads to the detriment of others.

Ensure SLAs in a Dynamic Environment: To comply with all contracts made with customers is challenging. Even though some knowledge of the future workloads to come may exist and some demand prediction engine is set, there is always some error, which may make the task of respecting all SLAs unfeasible.

Concurrent Control of Multiple Workloads Considering Interference: The allocation of resources to one workload affects the performance of all other workloads in the shared computational environment. This is the case even when the allocated resources for those other workloads are unchanged—the interference stems from low-level interaction in the hardware or processing systems.

In the context of a cyclic controller method, the cycle imposes artificial 'skipping' of adaptation and control actions for one workload proportionally to the number of concurrent workloads being executed. This may result in both delayed convergence and increased error with respect to the SLAs, either missing the set-point or by needlessly allocating excessive resources.

Scalability of Cyclic Controller: The cyclic approach presents a limitation with respect to the number of controlled workloads. More workloads in the cycle leads to longer cycles and it impacts directly on the interference generated by the other workloads. Although this is not a problem when considering a few workloads (it can be shown, for example, that up to seven workloads can be controlled in this cyclic approach), scaling up this strategy for more workloads may be a hard task, since many workloads are still being controlled even when their SLAs are already satisfied.

In one or more embodiments, the disclosed resource allocation techniques are based, at least in part, on the resource allocation techniques described in U.S. patent application Ser. No. 16/456,551, including a definition of a model for the dynamics of the iterative workload execution. The model is intended to be flexible enough to be adaptable to a wide range of workloads. To this end, some embodiments assume that a first order model that relates the SLA metric to allocations is good enough if adapted online, as suggested in X. Liu et al., "Adaptive Entitlement Control of Resource Containers on Shared Servers," IFIP/IEEE International Symposium on Integrated Network Management, 163-76 (May 2005), incorporated by reference herein in its entirety. In summary, one or more embodiments assume that the dynamics that relate allocations with SLA metrics are of the kind:

$$s_i(k)=s_i(k-1)+b_{1i}\Delta u_i(k)-b_{2i}\Sigma_{j\neq i}u_j(k),$$

where s(k) is the SLA metric of interest in step k, $b_{1i}$ is the term that relates the self-allocation of workload i with respect to target SLA metric, $b_{2i}$ is the term that accounts for interference of allocations of other workloads with respect to target SLA metric, and $u_i(k)$ is the amount of a particular resource allocated at a step k.

U.S. patent application Ser. No. 16/456,551 discloses an automatic mechanism to control multiple iterative workloads from a single machine, assuming the workloads share resources. This control does not assume prior knowledge of such workloads and aims to stabilize these in the long run with respect to SLA metrics. In at least one embodiment, the controller takes three pieces of information as inputs:
 the current SLA metric measured at the time of the control;
 the previously measured SLA metric; and
 the amount of CPU spent by all the other concurrent workloads.

All of the workloads are controlled and adapted once per cycle, by dividing the full control process into n steps, where n is the number of monitored/controlled workloads at a moment in time. (n−1) steps are used to collect enough data to adapt the self-allocation parameter, $\hat{b}_{1i}$, and the other remaining step to adapt the interference parameter, $\hat{b}_{2i}$, and apply the control law with both learned parameters.

One or more embodiments provide a mechanism to automatically adapt an infrastructure in order to accommodate workload necessity. The exemplary disclosed mechanism works by measuring the current performance of a workload and comparing the measured current performance to reference levels. This comparison allows on-the-fly adaptations to be performed and ensures a substantially maximum profit generation by respecting the SLAs associated with the workloads with higher profit generation potential, or the ones that lead to the highest fines if not respected.

FIG. 1 illustrates a given workload 100 with well-defined milestones 120 and associated effort 130 for a given infrastructure, according to one embodiment of the disclosure. One example of this kind of job is the training of a Deep Neural Network, which is performed in fixed-size iterations. It is assumed that workload 100 will produce information feedback 110-1 through 110-n, such as a scoring metric feedback 110-1, a scoring metric feedback 110-2, and a scoring metric feedback 110-j.

As shown in Adam Betts and Alastair F. Donaldson, "Estimating the WCET of GPU-Accelerated Applications Using Hybrid Analysis," *Real-Time Systems* (*ECRTS*) (2013), incorporated by reference herein in its entirety, ultimately, source code can be instrumented to perform such actions. So, this step is considered feasible for all kinds of jobs. In more well-behaved and specific embodiments, the source code is instrumented with intermediate feedback as a design decision.

As shown in FIG. 1, the percentage of effort 130 for a given infrastructure, such as a graphics processing unit (GPUs), is indicated between each exemplary milestone 120-1 through 120-j of the job 100.

Figure 2:
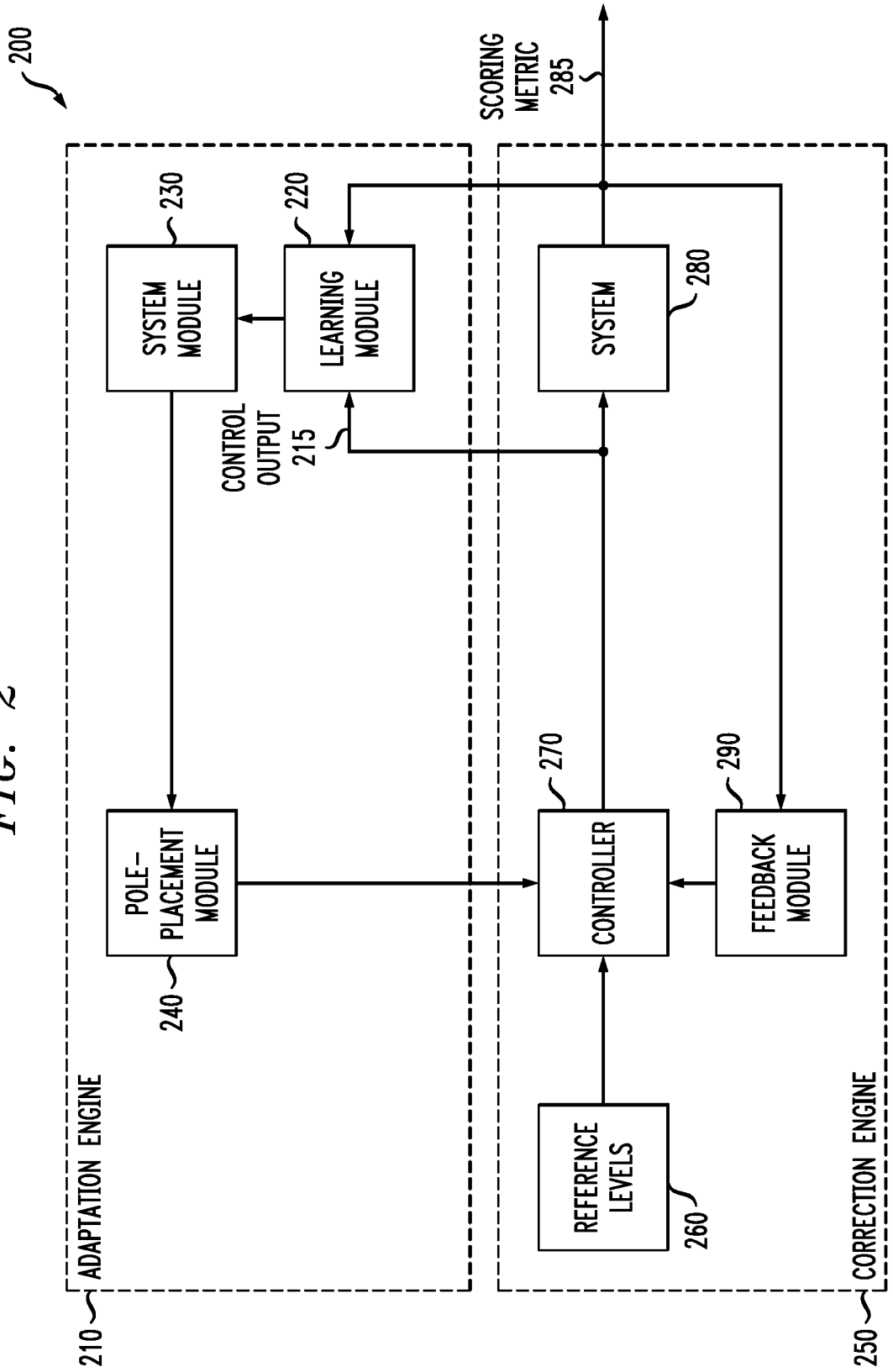
FIG. 2 illustrates a block diagram of an exemplary adaptation-correction system, according to some embodiments.

FIG. 2 illustrates a block diagram of an exemplary adaptation-correction system 200, according to some embodiments. As shown in FIG. 2, the exemplary adaptation-correction system 200 comprises two structures, namely, an adaptation engine 210 and a correction engine 250.

Generally, the exemplary adaptation engine 210 aims to map decisions and responses in order to get a transfer function between allocations and a given SLA metric, as discussed further below in conjunction with FIG. 4A. The exemplary adaptation engine 210 comprises a learning module 220, a system model 230, and a pole-placement module 240, discussed below in conjunction with FIG. 3. The learning module 220 processes a control output 215 from the correction engine 250, such as the amount of resources added (u(k)), and a scoring metric 285, such as a response time of a particular processing step.

Likewise, the exemplary correction engine 250 suggests changes to the allocated amount of resources in order to ensure satisfaction of the SLA, as discussed further below in conjunction with FIG. 5. The exemplary correction engine 250 generates a current value of a scoring metric 285 and comprises a set of reference levels 260, a controller 270, a system representation 280 and a feedback module 290, discussed below in conjunction with FIG. 3.

Figure 3:
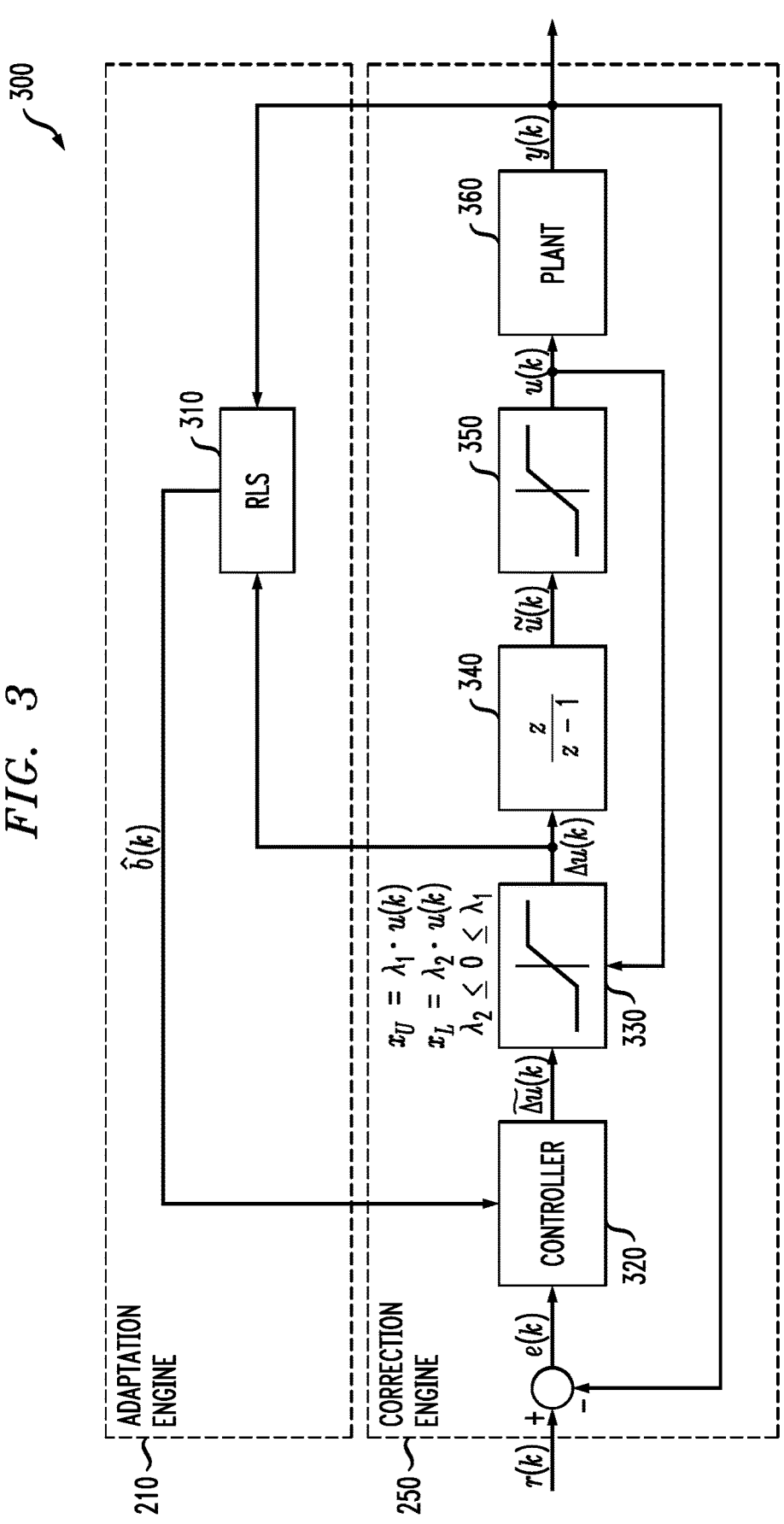
FIG. 3 illustrates an exemplary implementation of the adaptation-correction system of FIG. 2 in further detail, according to one or more embodiments of the disclosure.

FIG. 3 illustrates an exemplary implementation 300 of the adaptation-correction system 200 of FIG. 2 in further detail, according to one or more embodiments of the disclosure. In at least one embodiment, the adaptation engine 210 and the correction engine 250 work in tandem to ensure satisfaction of the SLA and perform simultaneous actions.

Adaptation Engine 210

As shown in FIG. 3, a Recursive Least Squares (RLS) module 310 in the adaptation engine 210 learns system parameters b(k), which are generated by the relation between the amount of resources added (u(k)) and the response time of the particular step y(k)).

The adaptation engine 210 may not be needed if a dynamic between resource allocation and a given SLA metric could be defined for each workload and this dynamic was the same or, at least, very similar. Since this typically cannot be assumed for each resource allocation-SLA metric pair, a learning step is needed. Even in the same job, multiple kinds of workloads might generate different allocation dynamics.

The dynamic relation between resource allocation and SLA metric is represented by Equation (1), below. It can be assumed, however, that these relationships can be mapped by a first order differential equation, as shown by X. Liu et al., "Adaptive Entitlement Control of Resource Containers on Shared Servers," *IFIP/IEEE International Symposium on Integrated Network Management*, 163-76 (May 2005), incorporated by reference herein in its entirety.

$$x(k+1)=a \cdot x(k)+b \cdot u(k) \quad (1)$$

Equation (1) is a first-order differential equation with parameters to be discovered used as a system model for the relation between resource allocation and SLA metric.

In Equation (1), a and b are the parameters to learn, which can be learned using any regression algorithms. The parameter a represents the current SLA metric observation, whereas b represents the effect of a different allocation u(k).

The output of the RLS learning module 310 is a parametrized system model, $\hat{b}(k)$, that will be used by the pole-placement module 240 in the adaptation engine 210 (where $\hat{b}$ is applied to the controller 320). The pole-placement module 240 ensures a desired closed loop dynamic between the system input (the amount of allocated resources, r(k)) and the output, y(k) (a value of a given SLA metric).

Correction Engine 250

As shown in FIG. 3, the correction engine 250 works by receiving feedback of the execution conditions, y(k), (typically, a given SLA metric) as well as the current learned model, $\hat{b}(k)$, generated by the RLS learning module 310 of the adaptation engine 210, as discussed hereinafter. The correction engine 250 uses this information to calculate the pole placement of the closed loop system. The pole placement calculation can be performed using Laplace Transforms, for example, when the differential equations are linear and with a finite order, or by using machine learning algorithm(s) in the more general cases, since a neural network with hidden layers is a universal approximator. See, for example, K. Hornik, "Approximation Capabilities of Multilayer Feedforward Networks," *Neural Networks*, Vol. 2, No. 4, 251-57 (1991), incorporated by reference herein in its entirety.

As shown in FIG. 3, a proportional controller 320 takes the parameter $\hat{b}(k)$ learned by the adaptation engine 210 and uses the parameter, $\hat{b}(k)$, to modify the feedback loop dynamics, which is fed by (r(k)−y(k)=e(k)), where r(k) is a target value of the scoring metric of interest 285, such as a target response time, and y(k) is the current value of the scoring metric 285, such as the response time of the particular step, to obtain an error, e(k).

The relation of the amount of resources added (u(k)) and the response time of the particular step y(k) is assumed to be piecewise linear, and a saturation module 330 is added after the controller 320 in order to bound the error between the assumed dynamics and the actual dynamics. In some embodiments, the saturation module 330 is adaptive as well, and has two parameters, $\lambda_1$ and $\lambda_2$, as shown in FIG. 3. These two parameters, $\lambda_1$ and $\lambda_2$, are associated with a trade-off between allowed oscillation around the set-point and convergence rates. The smaller the absolute value of these parameters are, the less the system 280 will oscillate, but convergence will be slower. An example of a particular parametrization of both parameters, $\lambda_1$ and $\lambda_2$, is discussed below in a section entitled "Example."

In the embodiment of FIG. 3, the system representation 280 of FIG. 2 is implemented using an integrator block 340, a saturation block 350 and a plant block 360. As shown in FIG. 3, the output of the saturation module 330 is processed by the integrator block 340, represented by the equation $$\frac{z}{z-1},$$

representing an integrator block in the Z-transform domain. The integrator block 340 represents that, in some embodiments, the output from the controller 320 and initial saturation block 330 is an increment in the current allocation, rather than a full allocation. To illustrate, suppose an allocation at time instant k is x(k)=4.1, the control output from the saturation module 330 is u(k)=0.1 and model parameter a=1. A next allocation according to equation (1) will be x(k+1)=4.1+0.1=4.2, instead of just 0.1, which means that the integrator block 340 will sum the contribution of the current control output, u(k), to the current allocation to obtain a new allocation.

The output of the integrator block 340 is processed by saturation block 350, which prevents the allocation from exceeding the amount of available resources (e.g., processing cores, memory or network bandwidth available) of the device. Thus, the inferior limit of the saturation block 350 is 0 in most implementations and the superior limit of the saturation block 350 is MAX_RESOURCE, where MAX_RESOURCE is the number of processing cores, amount of memory or amount of network bandwidth available of the device, depending on the resource that is being controlled (computation, memory or network, respectively). Finally, the plant block 360 translates the allocation, x(k), into a new SLA metric, y(k). In other words, the plant block 360 is typically implemented as a highly nonlinear function modeled as a first-order differential equation that continually learns the system model, $\hat{b} \sim b$, at each iteration.

For a more detailed discussion of the adaptation-correction system 200 of FIGS. 2 and 3, see, for example, U.S. patent application Ser. No. 16/400,289, filed May 1, 2019, entitled "Adaptive Controller for Online Adaptation of Resource Allocation Policies for Iterative Workloads Using Reinforcement Learning," incorporated by reference herein in its entirety.

Adaptation of Resource Allocation for Multiple Workloads

In one or more embodiments, a model is provided characterizing the dynamics of the workload execution. The disclosed model does not need to be perfect, but flexible enough to be adaptable to a wide range of workloads. To this end, a first order model that relates the SLA metric to allocations is assumed to be good enough if adapted online. See, for example, X. Liu et al., "Adaptive Entitlement Control of Resource Containers on Shared Servers," *IFIP/IEEE International Symposium on Integrated Network Management*, 163-76 (May 2005), incorporated by reference herein in its entirety. In summary, it is assumed that the dynamics that relate allocations with SLA metrics are from the λind:

$$s_i(k) = s_i(k-1) + b_{1i}\Delta u_i(k) - b_{2i}\sum_{j\neq i} u_j(k)$$

where s(k) is the SLA metric of interest in step k, $b_{1i}$ is the term that relates the self-allocation of workload i with respect to the target SLA metric, $b_{2i}$ is the term that accounts for interference of an allocation to other workloads with respect to the target SLA metric, $u_i(k)$ is the amount of a particular resource allocated at a step k.

In some embodiments, an automatic mechanism is provided to control multiple iterative workloads from a single machine in which the workloads share resources. This control assumes no prior knowledge of such workloads and aims to stabilize these in the long run with respect to the SLA metrics. The controller takes three pieces of information as inputs:
 the current SLA metric measured at the time of the control;
 the previously measured SLA metric; and
 the amount of CPU spent by all the other concurrent workloads.

This applied information is used to fit a linear control that cancels the dynamic, a deadbeat control that cancels both the direct dynamics (e.g., the dynamics related from allocation $r_i$ to workload $w_i$) and the interferences (e.g., the dynamics related from allocations $r_j$ to workload $w_i$, j≠i). This controller extends a controller disclosed in U.S. patent application Ser. No. 16/400,289, referenced above, with a new term to cancel possible effects from interferences. The control law for workload $w_i$ is, then:

$$u_i(k) = \frac{1}{k_c \cdot \hat{b}_{1i}} \cdot e_i(k) + \hat{b}_{2i}\sum_{j\neq i} u_j(k)$$

$$e_i(k) = s_i(k) - s_i(k - n + 1)$$

where n is the number of controlled workloads at the point in time k.

Figure 4A:
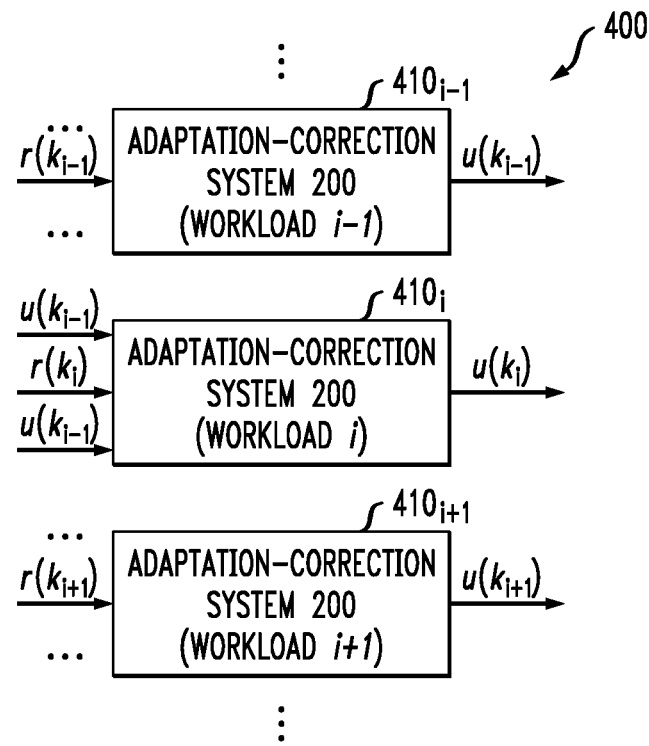
FIGS. 4A and 4B illustrate the adaptation-correction system of FIGS. 2 and 3 in further detail for multiple workloads, according to embodiments of the disclosure.

FIG. 4A illustrates an implementation 400 of the adaptation-correction system of FIGS. 2 and 3 in further detail for multiple workloads, according to embodiments of the disclosure. As shown in FIG. 4A, the implementation 400 comprises a plurality 410$_{i-1}$ through 410$_{i+1}$ of the adaptation-correction systems 200 of FIG. 2, each corresponding to a particular workload i−1 through i+1.

In the embodiment of FIG. 4A, the adaptation-correction system 410$_i$ associated with workload i receives as inputs r(k$_i$) target value of the scoring metric of interest 285, such as a target response time), and the amount of resources added for the other workloads (e.g., u(k$_{i-1}$) and u(k$_{i+1}$)). The adaptation-correction system 410$_i$ associated with workload i determines a new amount of resources to add for the current workload (i).

The adaptation-correction systems 410 associated with the other workloads (other than workload i) operate in a similar manner as the illustrated adaptation-correction system 410$_i$ for workload i.

Figure 4B:
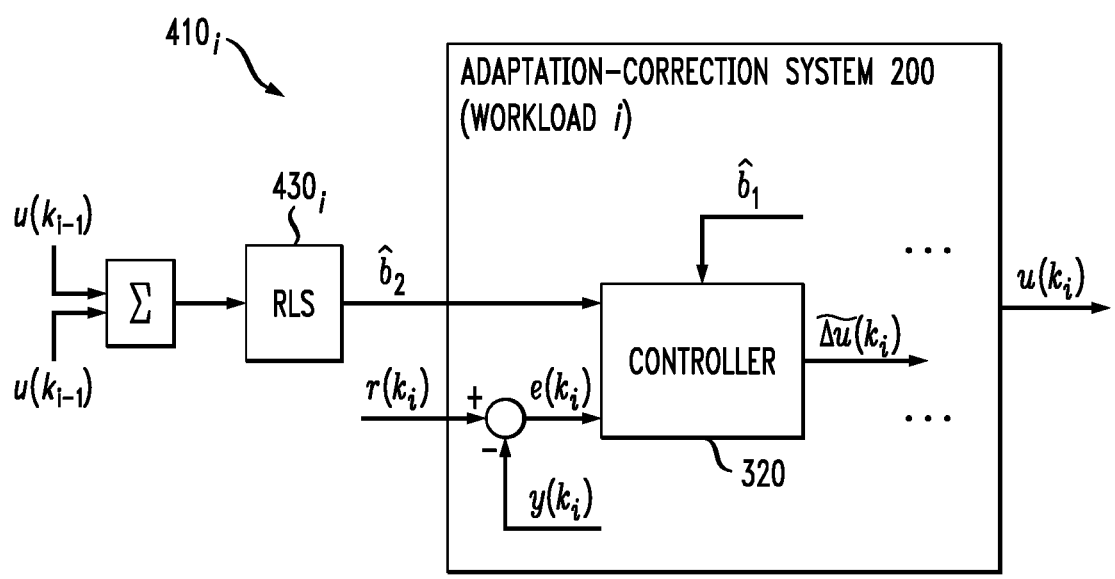

FIG. 4B illustrates the adaptation-correction system 410$_i$ associated with workload i of FIG. 4A in further detail, according to an embodiment of the disclosure. As shown in FIG. 4B, the adaptation-correction system 410$_i$ comprises the proportional controller 320 of FIG. 3 (as well as the other elements of the adaptation-correction system of FIGS. 2 and 3, which have been omitted for ease and clarity of illustration but operate in a similar manner as described above for the adaptation-correction system of FIGS. 2 and 3).

As shown in FIG. 4B, the proportional controller 320 takes the parameter $\hat{b}(k)$ learned by the adaptation engine 210 and uses the parameter, $\hat{b}(k)$, to modify the feedback loop dynamics, which is fed by (r(k)−y(k)=e(k)), where r(k) is a target value of the scoring metric of interest 285, such as a target response time, and y(k) is the current value of the scoring metric 285, such as the response time of the particular step, to obtain an error, e(k).

In addition, the adaptation-correction system 410i comprises a summer 420i to sum the allocations of the concurrent workloads (other than workload i) and uses a Recursive Least Squares (RLS) 430i for adaptation. RLS is a good choice for iteratively fitting a linear model, which is the case. Fitting successive linear models is faster than fitting non-linear models and can reasonably emulate these non-linearities with fast enough adaptation cycles.

As stated previously, the direct impact of changing allocations to a particular workload are considered, as well as the interference caused by other workloads.

Because there are two different metrics influencing the behavior of the workload performance, which is measured by the SLA metrics, three different actions are performed:
 1. adapt the parameter of self-allocation to SLA metric relationship;
 2. adapt the interference parameter; and
 3. control the workload (e.g., change the allocations to reach the desired SLA metric).

There may be a conflict between the two first necessities. If both metrics are adapted concomitantly, it is not possible to know if a change in the SLA metric occurred due to a change in the allocation for that particular workload (i.e., a self-allocation change) or due to changes in other allocations, which caused more or less interference.

In one or more embodiments, the disclosed solution alternates these actions. It is believed that in many cases the self-allocation parameter is more relevant to the SLA metric than interferences, and, thus, more data points are used to adapt the self-allocation parameter to obtain a more stable configuration.

This is done by dividing the full control process into n steps, where n is the number of monitored/controlled workloads at a moment in time. (n−1) steps are used to collect enough data to adapt the self-allocation parameter, $\hat{b}_{1i}$, and the other remaining step is used to adapt the interference parameter, $\hat{b}_{2i}$, and apply the control law with both learned parameters.

Figure 5:
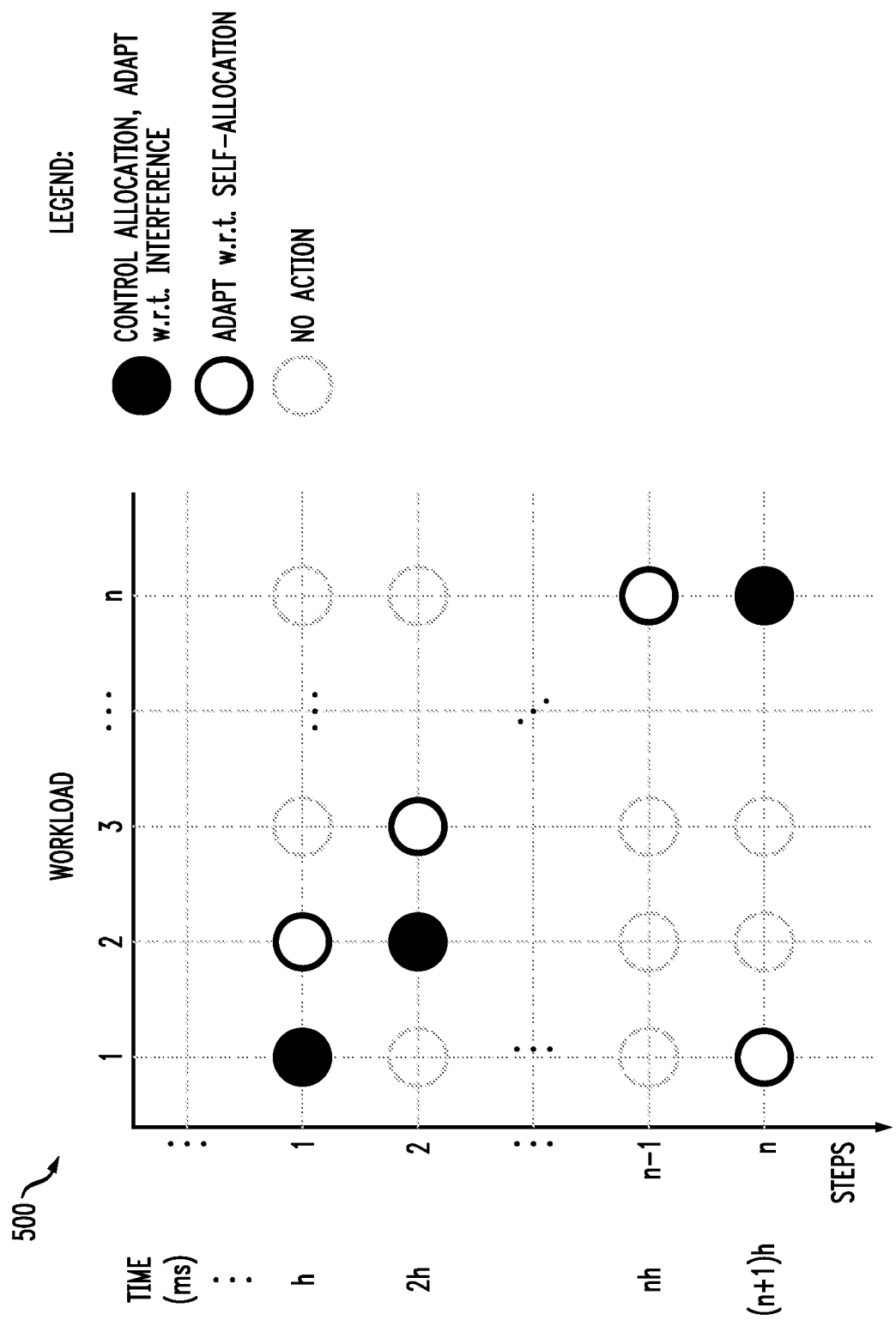
FIG. 5 illustrates exemplary cycles for adapting a resource allocation for multiple workloads, according to some embodiments.

FIG. 5 illustrates an exemplary cycle 500 of an alternating control/adaptation schema for adapting a resource allocation for multiple workloads (1 through n), according to some embodiments. The adaptation engine 210 (FIG. 2) adapts with respect to self-allocation for n−1 steps (e.g., steps 1 through n−1) after it changed its allocation. One step after that (step n), the adaptation engine 210 changes the allocation of this workload and the cycle restarts. The steps are sampled every h milliseconds in this example.

In comparison with a naive approach, the disclosed resource allocation method for multiple workloads 'skips' n−1 steps of control allocation for each workload. Since steps are sampled every h milliseconds, in some embodiments, this means that n×h milliseconds will pass before a workload performs control allocation again. For example, in FIG. 5, the resource allocation of workload 1 will be controlled in step 1 and then again only at step (n+1), instead of at every step. This impacts a convergence time of workload 1, (convergence here defined as being close enough to the set-point, e.g., step when iteration time reaches set-point within an acceptable percentage), in proportion to the number of competing workloads n. The impact of this delayed (and reduced number of) actuations for each workload in the convergence time is reasonably small enough to justify the approach (especially in cases where n is small, no discernable effect is observed on the convergence time).

The disclosed approach also leverages a mechanism to deal with the insertion and removal of workloads in an online fashion (e.g., meaning that the controller can be deployed as a continuously running process that deals with new workloads and finished workloads transparently). A mechanism is employed that keeps a list of active workload indexes $w_{idx}$ to be controlled and monitored. The list of active workload indexes $w_{idx}$ is updated in between cycles in order to avoid the impact of the interferences of newly added workloads in a workload that has not been controlled or adapted in a while.

The approach shown in FIG. 5 'skips' n−1 steps of control allocation for each workload, which has numerous advantages such as different time-spans for learning interference and self-allocation parameters, which lead to better control quality.

One or more aspects of the present disclosure recognize that since steps are sampled every h milliseconds, there are n×h milliseconds that will pass before a workload performs control allocation again in the cyclic approach. For example, the resource allocation of workload 1 in FIG. 5 will be controlled in step 1 and then again only at step (n+1), instead of at every step. This impacts a convergence time of workload 1 in proportion to the number of competing workloads n.

While the impact of this delayed (and reduced number of) actuations is reasonably small for a small number of concurrent workloads, the approach shown in FIG. 5 may suffer with scalability, since the number of control actions performed in a workload is directly proportional to the number of workloads in a cycle, assuming a fixed sampling rate.

One or more embodiments provide an early convergence detection mechanism that allows workloads to be removed from the controlled list if they already converged to the specified running time and remove them if they fall below the acceptable thresholds. This mechanism, detailed below, allows a greater focus on more difficult workloads by dedicating more control cycles to them.

Among other benefits, the disclosed resource allocation techniques allow for controlling more concurrent workloads, all while mitigating the delay in the convergence time caused by additional workloads. In some embodiments, an early-convergence detection is performed which allows converged workloads to be removed from the cycle. Thereafter, the converged workloads are optionally monitored to re-insert them in the cycle, if needed.

As discussed above, one issue is that if the number of workloads increases, each workload will stay a long time uncontrolled. To mitigate this, the disclosed early convergence detection mechanism is provided to avoid controlling already converged workloads.

Early-Convergence Detection

In one or more embodiments, the early-convergence detection mechanism receives the metrics of each workload at each iteration and ranks them at the end of a cycle. Afterwards, the early-convergence detection mechanism decides which workloads will be controlled in the next cycle.

FIG. 6 illustrates exemplary pseudo code for a convergence detection process 600 according to one embodiment of the disclosure. As shown in FIG. 6, two separate lists of workloads are kept: a controlled workloads list and a monitored workloads list. The controlled workloads list is a collection of workloads that will participate in the next control cycle. The monitored workloads list, on the other hand, keeps track of workloads already converged but not yet finished. In the following sections, the process of insertions, deletions and movement between the two lists is detailed.

Set-Point Error Computation

In at least one embodiment, a set-point error computation algorithm ranks each workload in terms of closeness to the set-point. The error metric can be chosen, and, in one embodiment of this invention, a modulus of Relative Error is used as a ranking metric. This error is calculated through the equation:

$$e_{s_i} = \frac{|s_i(k) - r_i(k)|}{r_i(k)},$$

where once again $s_i(k)$ is the SLA metric of workload i at discrete instant k and $r_i(k)$ is the corresponding reference levels for that SLA metric.

FIG. 7 illustrates two workloads 700 being executed concurrently and their respective error metrics using relative error, according to at least one embodiment. Each point in FIG. 7 is an iteration and the lines are the respective set-points. At the end of a cycle, each workload presents an error metric as shown in FIG. 7.

This error is then compared to a predefined convergence threshold. This threshold is defined by an operator and represents the tolerance for which the workload is assumed to be converged. Workloads whose error is smaller than the threshold are considered converged.

Figure 8:
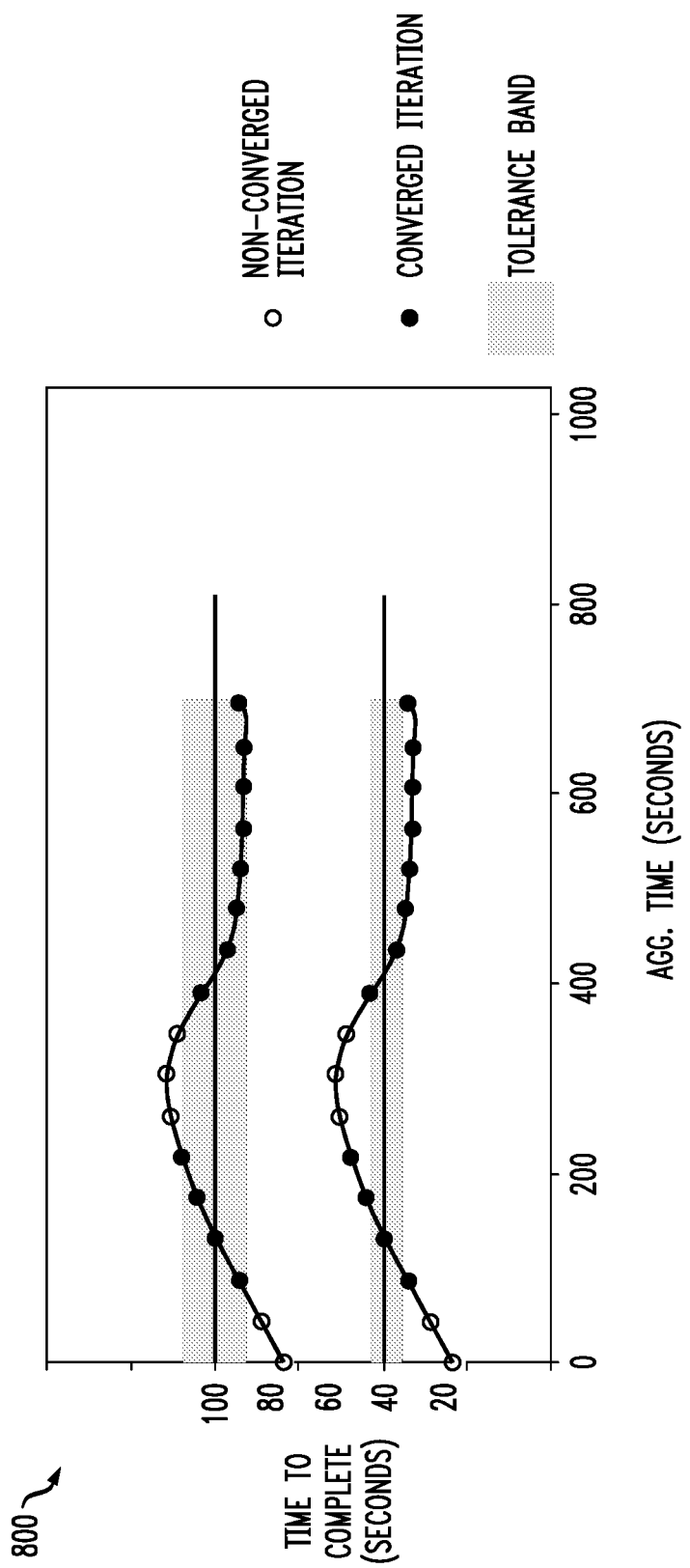
FIG. 8 illustrates two concurrent workloads with converged and non-converged iterations, according to an embodiment.

FIG. 8 illustrates two concurrent workloads 800 with converged and non-converged iterations, according to an embodiment. In the example of FIG. 8, a convergence detection embodiment uses only the current observation to determine convergence. In more complex scenarios, one can choose to wait for more iterations within the accepted range to flag a workload as "converged" and, subsequently, move the converged workload from the controlled workloads list to the monitored workload list, as would be apparent to a person of ordinary skill in the art.

Removal of Converged Workloads from Cycle

As noted above, U.S. patent application Ser. No. 16/456,551 discloses a mechanism for removing finished or failed executions of workloads from the control cycle.

Figure 9:
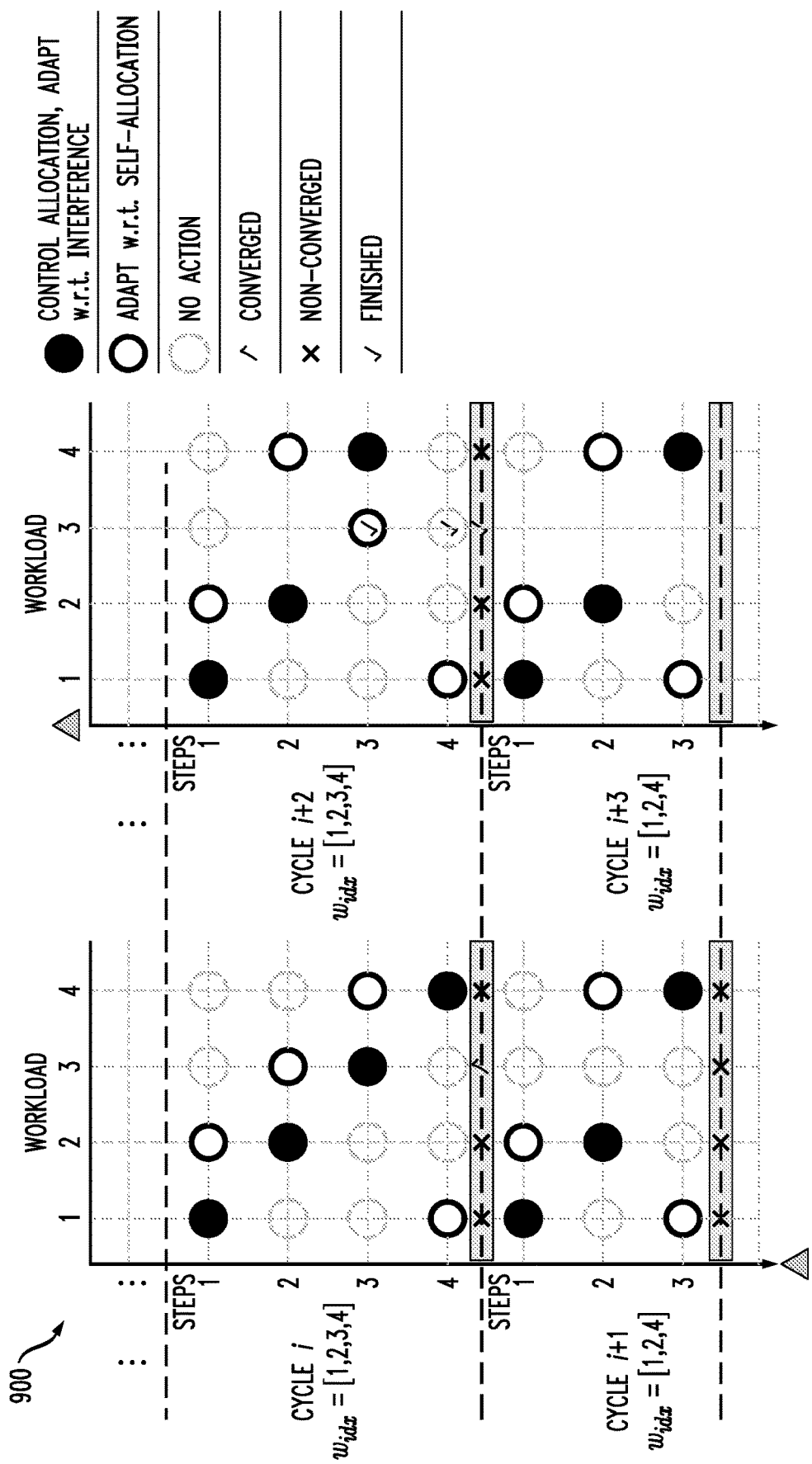
FIG. 9 illustrates an exemplary mechanism by which active workloads are updated between cycles, according to at least one embodiment of the disclosure.

FIG. 9 illustrates an exemplary mechanism 900 by which the active workloads are updated between cycles, according to at least one embodiment of the disclosure. As shown in FIG. 9, workload 3 converges in cycle i, and, thus, does not participate in the cycle i+1. Workload 3 leaves the convergence band at the end of cycle i+1, and, thus, participates again in cycle i+2. In cycle i+2, workload 3 finishes, and, thus, is removed from the controlled workloads list but is not included in the monitored workloads list.

In one or more embodiments of the present disclosure, the removal of workloads from the controlling cycle does not only occur when it is finished, but also when the convergence detection function returns that a workload is converged. When this happens, a status of the converged workload changes from controlled to monitored and the workload is removed from the control cycle, with further inclusion in the monitored list. Another situation that also ends in a removal of a workload from the controlled cycle is when the workload is finished. In this situation, the workload is not included in the monitored cycle. These steps are depicted in FIG. 9.

Divergence Detection

A converged workload might not remain converged until termination for a number of reasons, including, for example, natural oscillation of times, interference due to new workloads, and heavy adjustment in allocations of other running workloads. Thus, the convergence checking is applied to all workloads, monitored and controlled, at the end of each cycle. If a workload in the monitored list has errors above the predefined threshold, the converged monitored workload is re-inserted into the control cycle, for example, at the end of the list. An example of this situation is shown in FIG. 9, where workload 3, which is within the convergence bands at step i, is monitored at the end of cycle (i+1), in which it is not converged again (e.g., workload 3 has diverged). Workload 3 is, then, re-inserted at the end of the control cycle (i+2).

ADDITIONAL CONSIDERATIONS

The disclosed resource allocation techniques with early-convergence detection are also flexible in terms of error functions. For instance, it is usually not the same to have errors on the positive and negative side of the error spectrum. For SLAs that are given in terms of a minimal value (e.g., response time), positive errors represent SLA infringement, whereas negative errors represent a waste of resources, which is normally considered less harmful. Conversely, if the SLA is represented with a maximum, such as, for instance, latency, positive errors represent waste of resources and negative errors represent SLA infringements.

Figure 10:
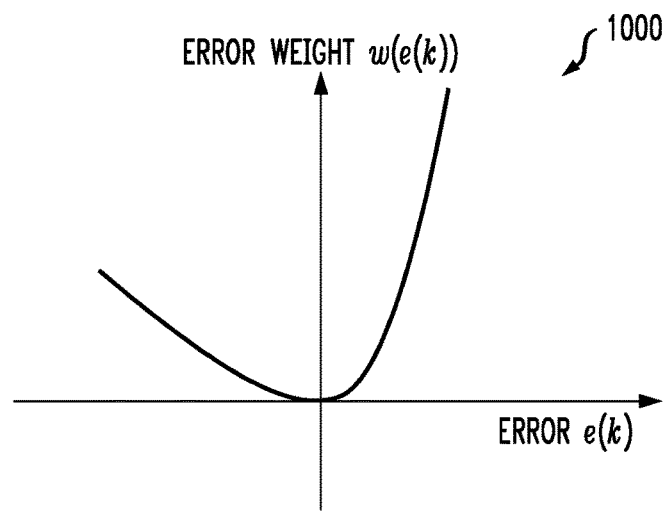
FIG. 10 illustrates an alternative asymmetric error weighting function to more heavily punish positive errors, according to some embodiments of the disclosure.

FIG. 10 illustrates an alternative asymmetric error weighting function 1000 to more heavily punish positive errors, according to some embodiments of the disclosure. In another embodiment of the present disclosure, the operator might fix a maximum number of workloads M, instead of a convergence threshold. This ensures that at maximum, M workloads will participate in control and actuation actions at each cycle. This has a direct correspondence with setting the maximum cycle time. If the maximum cycle time is set to T seconds, and the sampling time is h, only $$M = \frac{T}{h}$$

workloads can be controlled at each cycle. The workloads that will participate are the workloads that are further away from their set-points, as defined by the error function ranking.

In one exemplary implementation, the disclosed techniques for resource allocation with early-convergence detection can be employed for the training of deep neural networks for five different workloads, labeled 0 through 4. These configure iterative workloads in which the resource constraints are known (e.g., only the adaptation of CPU cores is addressed). It is noted, however, that this restriction is not part of the disclosure, which presumes in some embodiments that different workloads could be bound—and thus adapted—regarding different computation resources, including GPU memory and amount of dedicated stream processors.

Training Deep Learning models is a common task that is significantly resource intensive. The characteristic of the job is to be performed in fixed-size iterations, and each of these iterations receive the name of epoch. The number of training epochs is a parameter, which means the milestones of the job can be defined, and at each iteration, the rate of completion in percentage will be $100*i/n$ %, where i is the epoch number and n is the number of epochs specified. More granular milestones can be used in this particular example since processing each batch within an epoch is also a fixed size task, and that feature is used. Two different batches are assumed in some embodiments to take the same time to be processed if the machine state is similar. Thus, a batch or a collection of batches could also be used as the iteration to be controlled. A set point for the epoch was used, divided to find the set-point for a collection of k=100 batches and that set-point was controlled.

Figure 11:
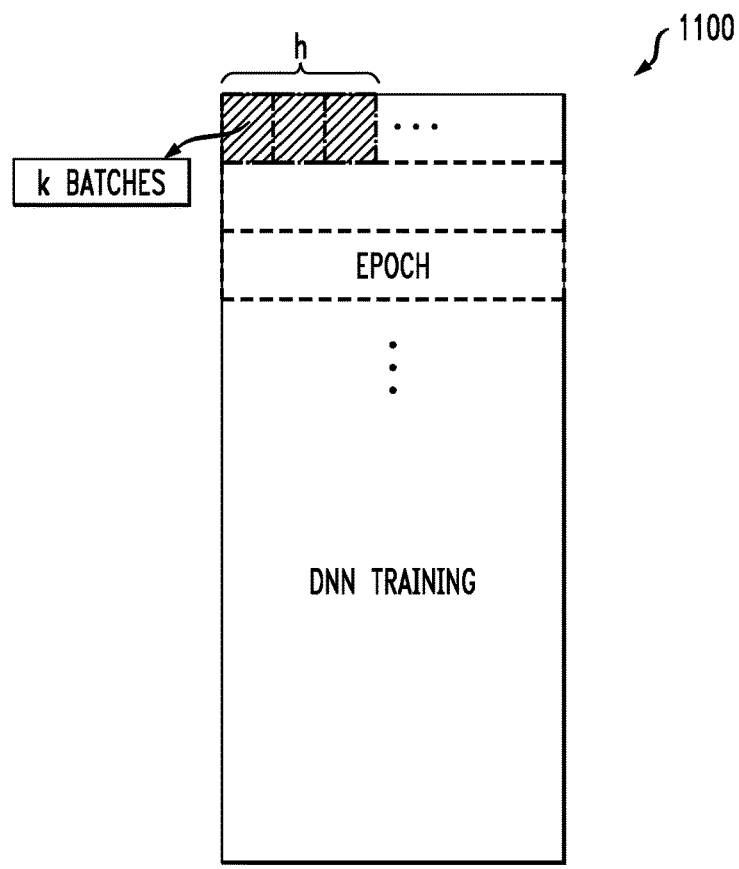
FIG. 11 illustrates a training of a deep neural network (DNN) as an iterative workload, itself comprised of multiple iterative workloads, according to an exemplary implementation of the disclosure.

FIG. 11 illustrates a training 1100 of a deep neural network (DNN) as an iterative workload, itself comprised of multiple iterative workloads. Each training is performed in a collection of epochs, which are, by themselves, a collection of equal-sized batches (k batches). Assuming that an SLA metric to be controlled is the execution time (et=T), one can feedback the amount of time t it took to complete an epoch and compare this time to the desired time per epoch, which is T/n, and the desired time for each of the k batches, which is $T/(n*(n/k))=T \cdot k/n^2$. If a collection of batches took longer than $T \cdot k/n^2$ to finish, more resources might me be needed. On the other hand, if the time t is significantly smaller than $T \cdot k/n^2$, this indicates that the job does not need the current amount of allocated resources and reducing the allocation can decrease cost and even make room for other jobs to run.

Figure 12:
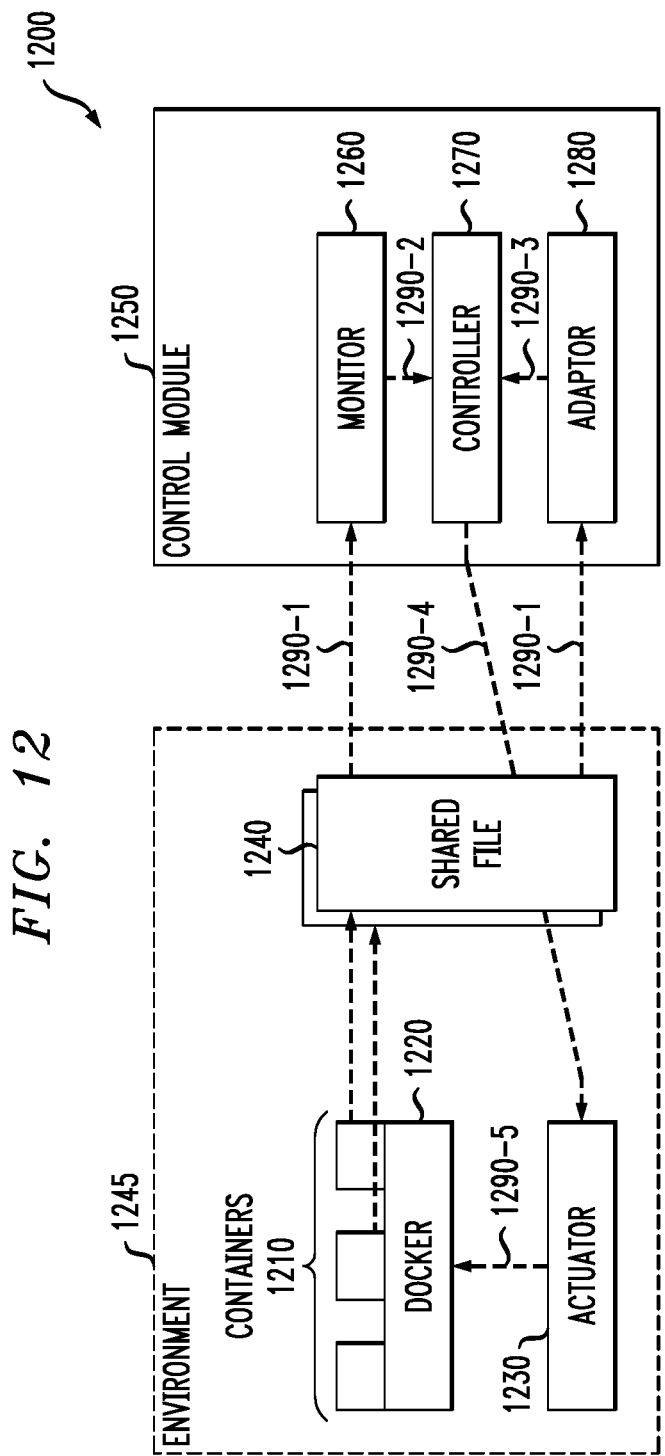
FIG. 12 illustrates an exemplary implementation of the disclosed resource allocation adaptation techniques for multiple workloads, according to some embodiments.

FIG. 12 illustrates an exemplary implementation 1200 of the disclosed resource allocation adaptation techniques for multiple workloads, according to some embodiments. The exemplary implementation 1200 uses a plurality of containers 1210, such as Docker containers 1220, which execute the iterative workloads in a shared execution environment, to implement the adaptive controller 270 of FIG. 2. Generally, Docker is a well-known lightweight container solution for multiple Operating Systems (OSs), offering controls over central processing unit (CPU) and memory limits. See, for example, D. Merkel, "Docker: Lightweight Linux Containers for Consistent Development and Deployment," Linux Journal, Vol. 2, 239 (2014), incorporated by reference herein in its entirety.

In one or more embodiments, one of the containers 1210 is chosen as the controller container (corresponding to the system 280 of FIG. 2) and metrics are measured in real-time. Messaging between the Docker container 1220 and a control module 1250 is implemented in the embodiment of FIG. 12 using a shared file 1240, in a known manner. The control module 1250 comprises a monitor 1260, a controller 1270 and an adaptor 1280. The exemplary monitor 1260 is a possible implementation of the feedback module 290; controller 1270 implements the elements in the correction engine 250 and the adaptor 1280 implements the mechanisms in the adaptation engine 210 of FIG. 2, and operates in a similar manner as described above.

The containers 1210/1220, actuator 1230 and shared file 1240 are part of an environment 1245.

At the end of each iteration, the containers 1210 send their performance metrics to a shared file 1240, from which the monitor 1260 and adaptor 1280 are listening (e.g., using read operations 1290-1 every h seconds). The monitor 1260 takes the error metric and sends it to the controller 1270 during step 1290-2. Adaptor 1280 infers a new parameter b and also sends it to the Controller 1270 during step 1290-3. Finally, the Controller 1270 generates a new increment in allocation, which is sent to an actuation topic of shared file 1240 during step 1290-4. The actuator 1230 is listening to this topic, and changes allocation when a new message arrives to update the containers 1210 during step 1290-5.

Figure 13:
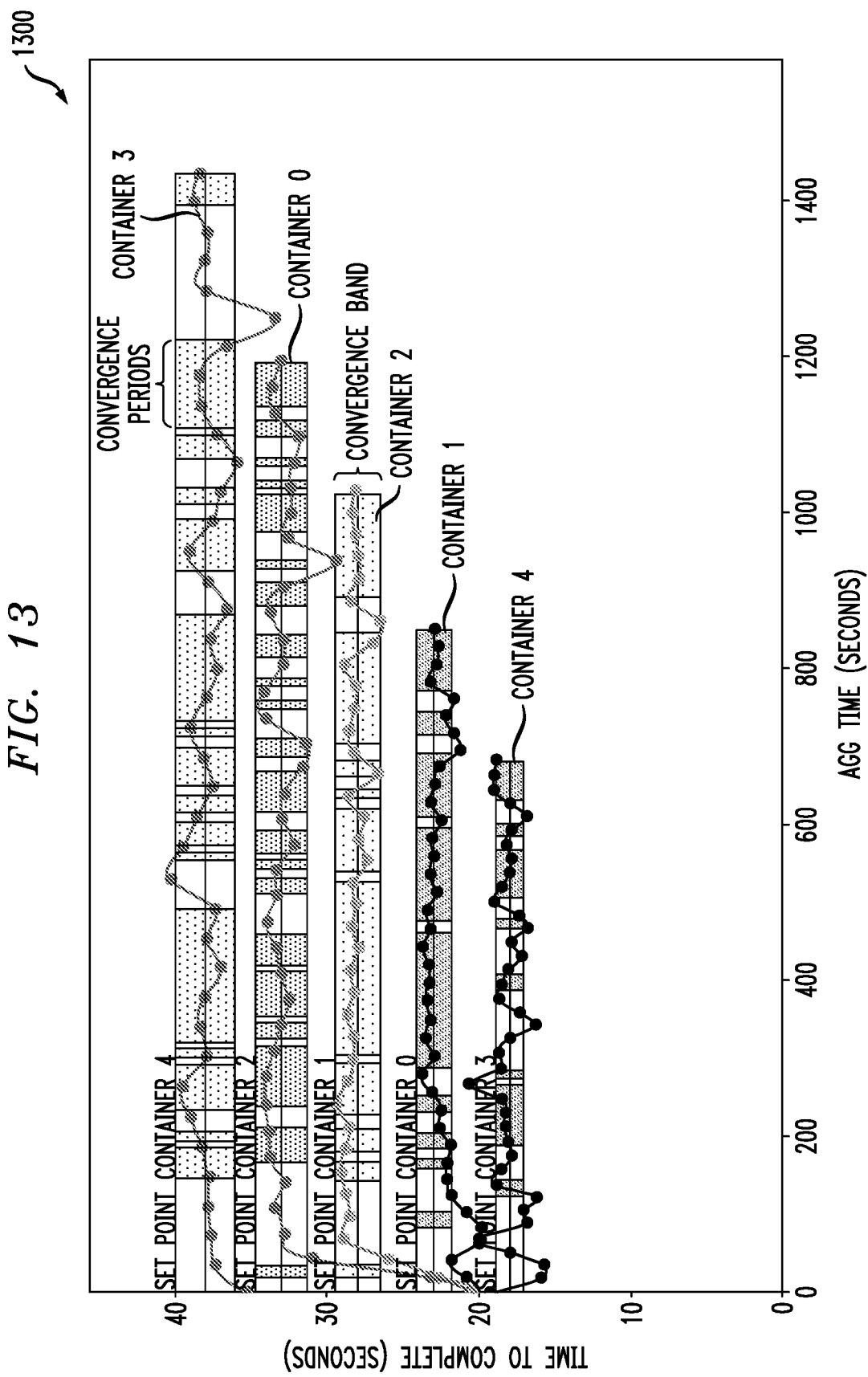
FIG. 13 illustrates an exemplary time for completion for each epoch and respective set-points for a resource allocation adaptation for adapting five exemplary workloads implemented using respective containers, according to one embodiment of the disclosure.

In one exemplary implementation five DNN workloads were deployed with a different desired time per epoch (set-point). FIG. 13 illustrates an exemplary time for completion 1300 for each epoch and respective set-points for a resource allocation adaptation for adapting five exemplary workloads implemented using respective containers 0 through 4, according to one embodiment of the disclosure. This was achieved using the disclosed schema in FIG. 12, with $\lambda_1=0.25$ and $\lambda_2=-0.25$ for all workloads. It can be observed that the system takes up to 8 epochs to reach the set-point and tracks it smoothly. By using this controller, the operator has saved some resources by comparing to the initial allocation of four full CPU cores. It also appears that modelling interferences is desirable. It has been observed that, once a more resource intensive workload ends, the other workloads need less allocated resources to continue running within the desired set-points. Each of the workloads take 40 epochs to finish. It can be seen that the proposed mechanism achieves fast set-point tracking.

Figure 14:
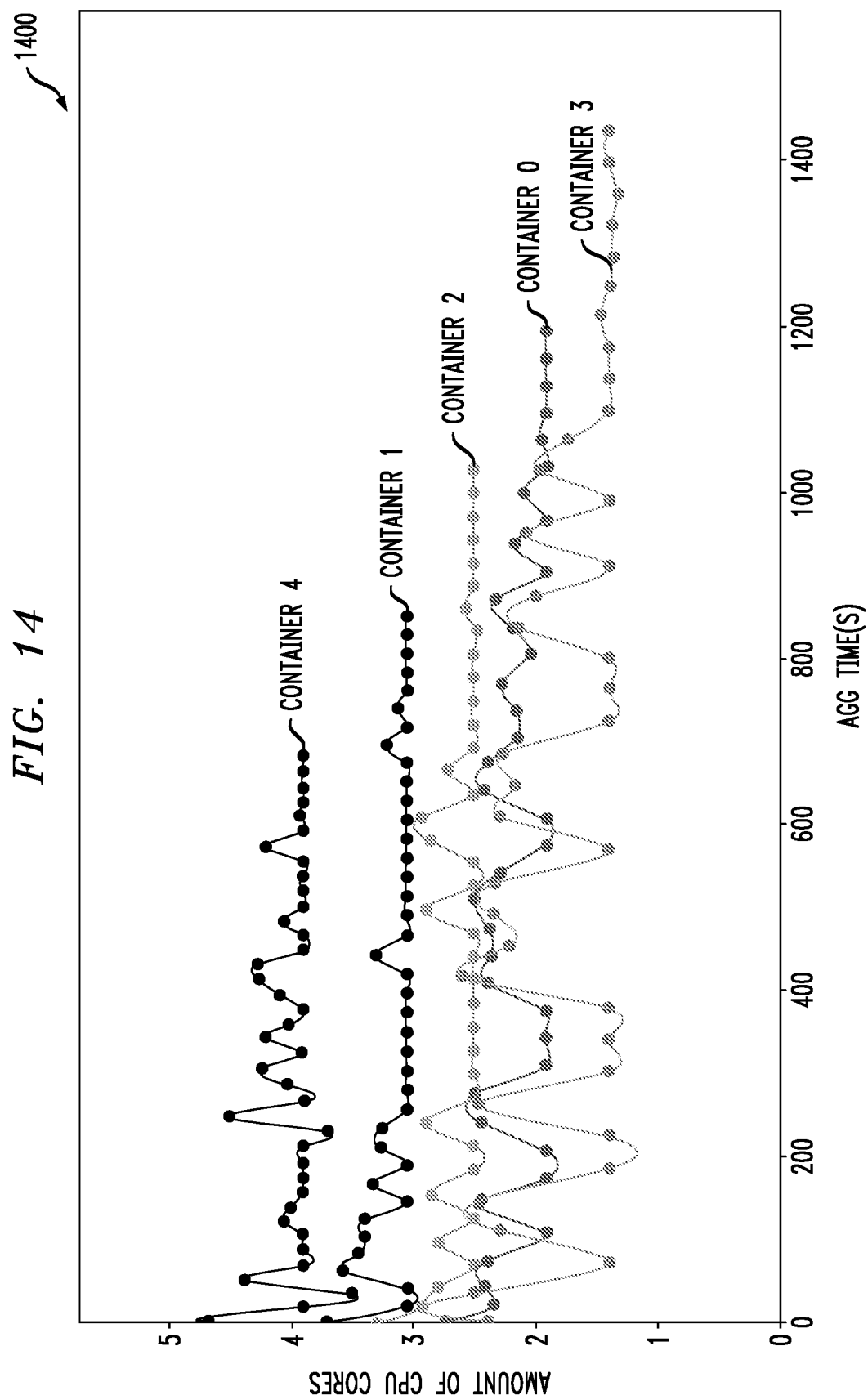
FIG. 14 illustrates an exemplary allocation of a particular resource for each workload of five exemplary workloads implemented using respective containers, according to some embodiments of the disclosure.

FIG. 14 illustrates an exemplary allocation 1400 of a particular resource (e.g., CPU shares) for each workload of five exemplary workloads implemented using respective containers 0 through 4, according to some embodiments of the disclosure. In the graph of FIG. 14, when more resource consuming workloads finish, the other workloads can lower their allocations to keep tracking their set-points.

The examples of FIGS. 13 and 14 illustrate the effect of interference. When a more resource intensive workload ends, the requirements for the less intensive ones drop by a little, because the workload is not interfering with the other one anymore. The disclosed resource allocation techniques with early-convergence detection, however, are still able to maintain the set-point level tracking in such situation, working as expected.

Thus, the disclosed resource allocation techniques for multiple workloads can control the resource allocation of several workloads concurrently. In addition, the convergence times are within an acceptable range. In fact, a negligible negative impact was noticed on the convergence times when compared to the resource allocation experiments controlling each workload in isolation. Finally, the disclosed resource allocation approach enables the resource allocation adaptation in cases where the naive approach does not apply.

Figure 15:
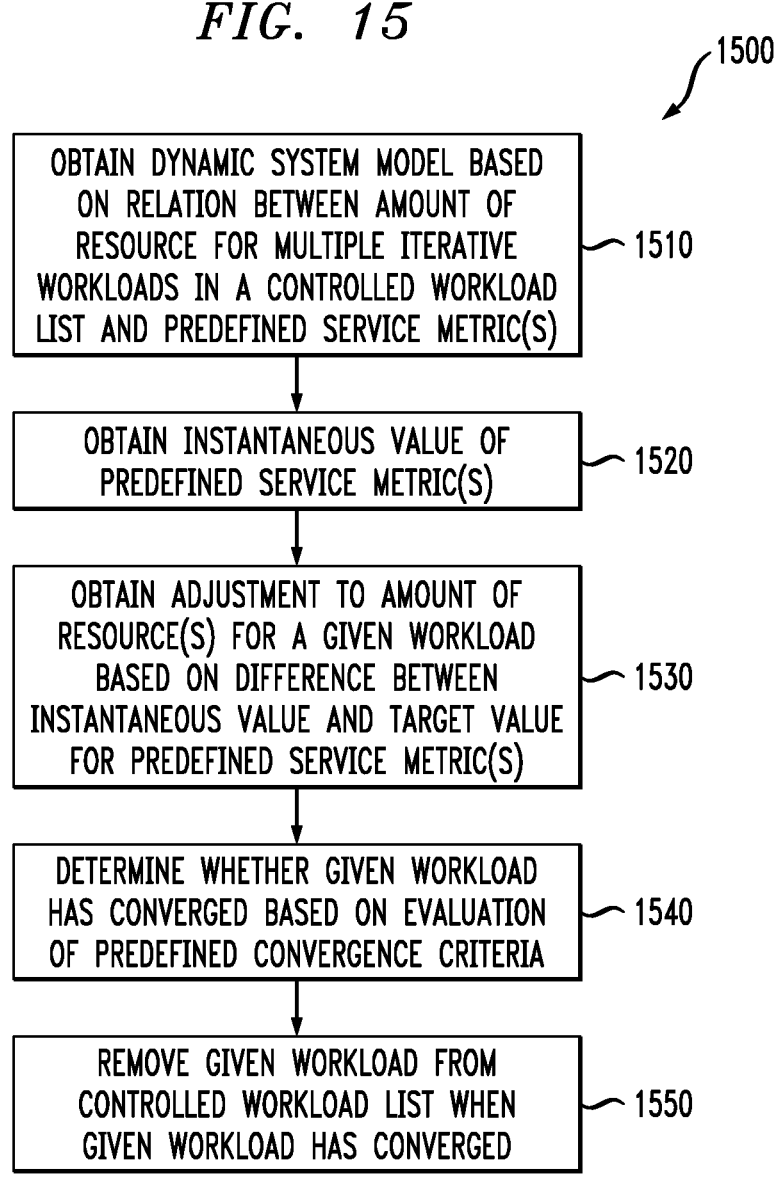
FIG. 15 is a flow chart illustrating an exemplary implementation of a resource allocation adaptation process for multiple workloads with early-convergence detection, according to one embodiment of the disclosure.

FIG. 15 is a flow chart illustrating an exemplary implementation of a resource allocation adaptation process 1500 for multiple workloads with early-convergence detection, according to one embodiment of the disclosure. As shown in FIG. 15, the exemplary resource allocation adaptation process 1500 initially obtains a dynamic system model during step 1510 based on a relation between an amount of at least one resource for multiple iterative workloads in a controlled workload list and one or more predefined service metric(s), where the workloads in the controlled workload list participate in an adaptation cycle. In addition, an instantaneous value of the service metric(s) is obtaining during step 1520, for example, from a resource allocation correction module.

During step 1530, an adjustment is obtained to the amount of the at least one resource for a given workload based (at least in part) on a difference between the instantaneous value of the at least one predefined service metric and a target value for the at least one predefined service metric (e.g., an evaluation of (i) the at least one predefined service metric with respect to a predefined set point; and/or (ii) a number of controlled workloads).

The exemplary resource allocation adaptation process 1500 determines during step 1540 whether the given workload has converged based on an evaluation of one or more predefined convergence criteria.

Finally, the given workload is removed from the controlled workload list during step 1550 when the given workload has converged.

Uncertainties in the environment often call for an adaptation engine. Because agreements are placed prior to execution and must be met in spite of any change of conditions, this adaptation engine must be sound, robust, and enforce stability, because instability might lead to malfunctions and unreliable allocations, which could ultimately disrupt all of the tasks running. Control theory-based feedback to resource allocation offers substantial guarantees from control theory such as stability, resilience to disturbances and reference tracking.

One or more embodiments of the present disclosure employ information from workload iterations to detect and remove workloads from the control cycle. Among other benefits, online learning and dynamic system control are employed in order to learn and control the execution of workloads of which little information is known at first. In addition, removing the workloads from the control cycle allows more workloads to be executed in parallel, since the total time of the cycle will still be small enough, and, also, a finer granularity of control is provided over more difficult workloads, which will remain in the cycle after others leave. Further, the disclosed resource allocation methodologies accelerate the convergence for all workloads in at least some embodiments, since the interference on the non-converged workloads will not change for the converged workloads, since their allocation will not change in the cycle.

The disclosed resource allocation mechanism can also be utilized independently of the number of current workloads, because in at least one embodiment, the maximum time per cycle can be defined. This means that only the first M or less workloads will be controlled. The criteria to rank workloads can be various and range from having higher errors, comparatively, to having a pre-defined priority criterion set or a combination of multiple metrics.

In addition, by removing converged workloads from the control cycle, the time between the cycle iterations is reduced. Further, the number of control actions per time unit can be increased to the workloads that actually need corrections and spend less time on the workloads that are already in an acceptable time range in terms of execution time, which increases the time of SLA compliance.

For each workload, the effects of self-allocation with respect to response time and interference with respect to response time are learned online. A cyclic control and adaptation routine is disclosed that looks into an ordered list of workloads and cycles through the ordered list to determine when each workload learns to adapt itself to the effects of its own allocation and to the interference caused by the other concurrent workloads. This structure also allows for including newly deployed workloads in the cycle and removing finished workloads. Also, since these parameters are not dependent on the step time h, it also can optionally be changed between cycles to reflect the current list necessity.

In addition, the proposed cyclic controller mechanism can transparently deal with the redeployment of failed workloads. The adoption of the last-known resource allocation of the failed workload for its redeployment mitigates the effect of the interference factor of that workload in the resource allocation of the others.

In some embodiments, the disclosed techniques for adapting a resource allocation for multiple iterative workloads with early-convergence detection reduce an amount of time needed to perform a resource allocation for such multiple iterative workloads. One or more embodiments of the disclosure provide improved methods, apparatus and computer program products for adapting a resource allocation for multiple workloads with early-convergence detection. The foregoing applications and associated embodiments should be considered as illustrative only, and numerous other embodiments can be configured using the techniques disclosed herein, in a wide variety of different applications.

It should also be understood that the disclosed adaptive resource allocation techniques with early-convergence detection, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for adapting a resource allocation for multiple iterative workloads with early-convergence detection may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based resource allocation engine 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 16 and 17. These platforms may also be used to implement at least portions of other information processing systems in other embodiments.

Figure 16:
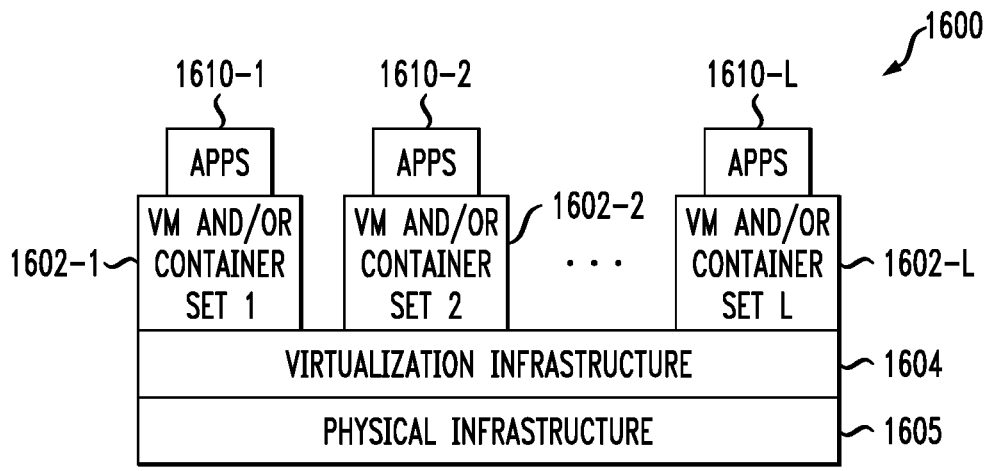
FIG. 16 illustrates an exemplary processing platform that may be used to implement at least a portion of one or more embodiments of the disclosure comprising a cloud infrastructure.

FIG. 16 shows an example processing platform comprising cloud infrastructure 1600. The cloud infrastructure 1600 comprises a combination of physical and virtual processing resources that may be utilized to implement at least a portion of the adaptation-correction system 200. The cloud infrastructure 1600 comprises multiple virtual machines (VMs) and/or container sets 1602-1, 1602-2, . . . 1602-L implemented using virtualization infrastructure 1604. The virtualization infrastructure 1604 runs on physical infrastructure 1605, and illustratively comprises one or more hypervisors and/or operating system level virtualization infrastructure. The operating system level virtualization infrastructure illustratively comprises kernel control groups of a Linux operating system or other type of operating system.

The cloud infrastructure 1600 further comprises sets of applications 1610-1, 1610-2, . . . 1610-L running on respective ones of the VMs/container sets 1602-1, 1602-2, . . . 1602-L under the control of the virtualization infrastructure 1604. The VMs/container sets 1602 may comprise respective VMs, respective sets of one or more containers, or respective sets of one or more containers running in VMs.

In some implementations of the FIG. 16 embodiment, the VMs/container sets 1602 comprise respective VMs implemented using virtualization infrastructure 1604 that comprises at least one hypervisor. Such implementations can provide resource allocation functionality of the type described above for one or more processes running on a given one of the VMs. For example, each of the VMs can implement resource allocation control logic for providing adaptive resource allocation for multiple workloads for one or more processes running on that particular VM.

An example of a hypervisor platform that may be used to implement a hypervisor within the virtualization infrastructure 1604 is the VMware® vSphere® which may have an associated virtual infrastructure management system such as the VMware® vCenter™. The underlying physical machines may comprise one or more distributed processing platforms that include one or more storage systems.

In other implementations of the FIG. 16 embodiment, the VMs/container sets 1602 comprise respective containers implemented using virtualization infrastructure 1604 that provides operating system level virtualization functionality, such as support for Docker containers running on bare metal hosts, or Docker containers running on VMs. The containers are illustratively implemented using respective kernel control groups of the operating system. Such implementations can provide resource allocation functionality of the type described above for one or more processes running on different ones of the containers. For example, a container host device supporting multiple containers of one or more container sets can implement one or more instances of resource allocation control logic and for use in performing adaptive resource allocation for multiple workloads.

As is apparent from the above, one or more of the processing modules or other components of system 200 may each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises at least a portion of the given system and includes a plurality of processing devices, denoted 1702-1, 1702-2, 1702-3, ... 1702-K, which communicate with one another over a network 1704. The network 1704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1702-1 in the processing platform 1700 comprises a processor 1710 coupled to a memory 1712. The processor 1710 may comprise a microprocessor, a microcontroller, an application specific integrated circuit (ASIC), a field programmable gate array (FPGA) or other type of processing circuitry, as well as portions or combinations of such circuitry elements, and the memory 1712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and the given system may include additional or alternative processing platforms, as well as numerous distinct processing platforms in any combination, with each such platform comprising one or more computers, storage devices or other processing devices.

Figure 17:
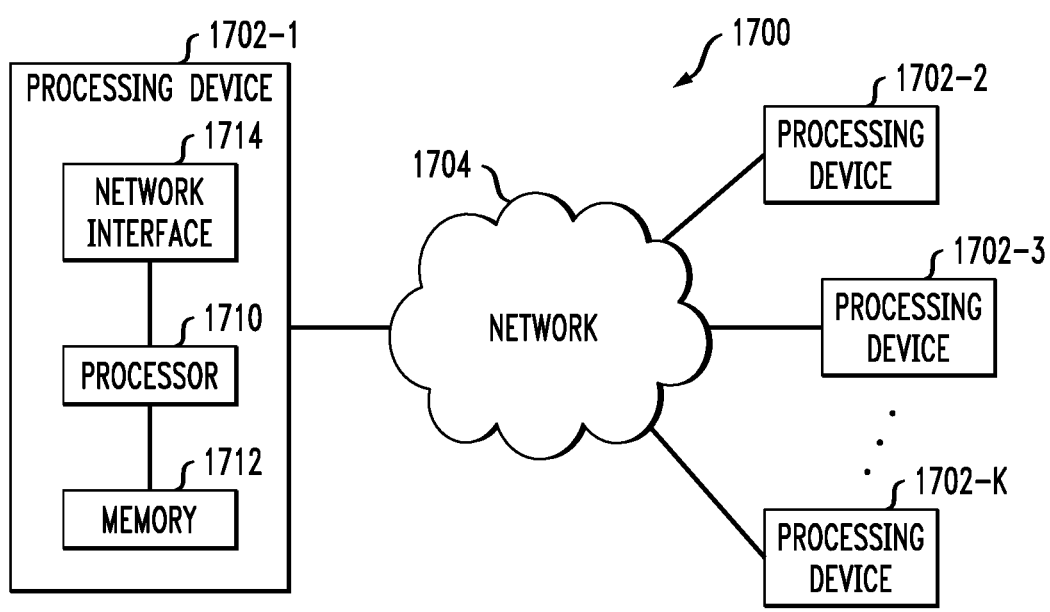
FIG. 17 illustrates another exemplary processing platform that may be used to implement at least a portion of one or more embodiments of the disclosure.

Multiple elements of an information processing system may be collectively implemented on a common processing platform of the type shown in FIG. 16 or 17, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a dynamic system model based on a relation between an amount of at least one resource for a plurality of workloads in a controlled workload list and at least one predefined service metric, wherein the plurality of workloads in the controlled workload list participate in an adaptation cycle;

obtaining an instantaneous value of the at least one predefined service metric;

obtaining an adjustment to the amount of the at least one resource for a given one of the plurality of workloads in the controlled workload list based at least in part on a difference between the instantaneous value of the at least one predefined service metric and a target value for the at least one predefined service metric;

determining whether the given one of the plurality of workloads has converged based on an evaluation of one or more predefined convergence criteria;

removing the given one of the plurality of workloads from the controlled workload list when the given one of the plurality of workloads has converged; and initiating an application of the determined adjustment to the amount of the at least one resource to the given one of the plurality of workloads, wherein the method is performed by at least one processing device comprising a processor coupled to a memory.

2. The method of claim 1, wherein the adjustment to the amount of the at least one resource for the given one of the plurality of workloads is further based on the dynamic system model, and an interference effect of one or more additional workloads of the plurality of workloads on the given one of the plurality of workloads.

3. The method of claim 1, further comprising reinserting the given one of the plurality of workloads in the controlled workload list when the given one of the plurality of workloads fails to satisfy a predefined divergence threshold.

4. The method of claim 3, wherein one more of the workloads removed from the controlled workload list are listed in a monitored workload list following the removal for evaluation of a performance of the one more workloads in the monitored workload list, and wherein the given one of the plurality of workloads is reinserted in the controlled workload list from the monitored workload list.

5. The method of claim 1, wherein one of the plurality of workloads that finished processing is removed from one or more of the controlled workload list and a monitored workload list.

6. The method of claim 1, wherein the evaluation of the predefined convergence criteria evaluates one or more of (i) the at least one predefined service metric with respect to a predefined set point; and (ii) a number of controlled workloads.

7. The method of claim 6, wherein the evaluation of the at least one predefined service metric with respect to the predefined set point evaluates a predefined error metric relative to a predefined convergence threshold.

8. The method of claim 1, wherein a determination of the adjustment to the amount of the at least one resource for the given one of the plurality of workloads is performed substantially in parallel with an execution of the plurality of workloads.

9. A computer program product, comprising a tangible non-transitory machine-readable storage medium having encoded therein executable code of one or more software programs, wherein the one or more software programs when executed by at least one processing device perform the following steps:

obtaining a dynamic system model based on a relation between an amount of at least one resource for a plurality of workloads in a controlled workload list and at least one predefined service metric, wherein the plurality of workloads in the controlled workload list participate in an adaptation cycle;

obtaining an instantaneous value of the at least one predefined service metric;

obtaining an adjustment to the amount of the at least one resource for a given one of the plurality of workloads in the controlled workload list based at least in part on a difference between the instantaneous value of the at least one predefined service metric and a target value for the at least one predefined service metric;

determining whether the given one of the plurality of workloads has converged based on an evaluation of one or more predefined convergence criteria;

removing the given one of the plurality of workloads from the controlled workload list when the given one of the plurality of workloads has converged; and initiating an application of the determined adjustment to the amount of the at least one resource to the given one of the plurality of workloads.

10. The computer program product of claim 9, further comprising reinserting the given one of the plurality of workloads in the controlled workload list when the given one of the plurality of workloads fails to satisfy a predefined divergence threshold.

11. The computer program product of claim 9, wherein one of the plurality of workloads that finished processing is removed from one or more of the controlled workload list and a monitored workload list.

12. The computer program product of claim 9, wherein the evaluation of the predefined convergence criteria evaluates one or more of (i) the at least one predefined service metric with respect to a predefined set point; and (ii) a number of controlled workloads.

13. The computer program product of claim 9, wherein a determination of the adjustment to the amount of the at least one resource for the given one of the plurality of workloads is performed substantially in parallel with an execution of the plurality of workloads.

14. The computer program product of claim 9, wherein the adjustment to the amount of the at least one resource for the given one of the plurality of workloads is further based on the dynamic system model, and an interference effect of one or more additional workloads of the plurality of workloads on the given one of the plurality of workloads.

15. An apparatus, comprising:
a memory; and
at least one processing device, coupled to the memory, operative to implement the following steps:

obtaining a dynamic system model based on a relation between an amount of at least one resource for a plurality of workloads in a controlled workload list and at least one predefined service metric, wherein the plurality of workloads in the controlled workload list participate in an adaptation cycle;

obtaining an instantaneous value of the at least one predefined service metric;

obtaining an adjustment to the amount of the at least one resource for a given one of the plurality of workloads in the controlled workload list based at least in part on a difference between the instantaneous value of the at least one predefined service metric and a target value for the at least one predefined service metric;

determining whether the given one of the plurality of workloads has converged based on an evaluation of one or more predefined convergence criteria;

removing the given one of the plurality of workloads from the controlled workload list when the given one of the plurality of workloads has converged; and initiating an application of the determined adjustment to the amount of the at least one resource to the given one of the plurality of workloads.

16. The apparatus of claim 15, further comprising reinserting the given one of the plurality of workloads in the controlled workload list when the given one of the plurality of workloads fails to satisfy a predefined divergence threshold.

17. The apparatus of claim 15, wherein one of the plurality of workloads that finished processing is removed from one or more of the controlled workload list and a monitored workload list.

18. The apparatus of claim 15, wherein the evaluation of the predefined convergence criteria evaluates one or more of (i) the at least one predefined service metric with respect to a predefined set point; and (ii) a number of controlled workloads.

19. The apparatus of claim 15, wherein a determination of the adjustment to the amount of the at least one resource for the given one of the plurality of workloads is performed substantially in parallel with an execution of the plurality of workloads.

20. The apparatus of claim 15, wherein the adjustment to the amount of the at least one resource for the given one of the plurality of workloads is further based on the dynamic system model, and an interference effect of one or more additional workloads of the plurality of workloads on the given one of the plurality of workloads.

* * * * *